United States Patent [19]

Yeakley

[11] Patent Number: 4,535,372
[45] Date of Patent: Aug. 13, 1985

[54] POSITION TRACKING SERVO CONTROL SYSTEMS AND METHODS

[75] Inventor: Lester M. Yeakley, Boulder, Colo.

[73] Assignee: Storage Technology Corporation, Louisville, Colo.

[21] Appl. No.: 509,238

[22] Filed: Jun. 29, 1983

[51] Int. Cl.$^3$ ............................ G11B 5/55; G11B 5/58
[52] U.S. Cl. ........................................ 360/77; 360/78
[58] Field of Search .................... 360/77, 78; 318/561, 318/592, 594, 596

[56] References Cited

U.S. PATENT DOCUMENTS

| | | | |
|---|---|---|---|
| 4,068,269 | 1/1978 | Commander et al. | 360/78 |
| 4,115,823 | 9/1978 | Commander et al. | 360/77 |
| 4,200,827 | 4/1980 | Oswald | 318/561 |
| 4,297,734 | 10/1981 | Laishley et al. | 360/78 |

Primary Examiner—George G. Stellar
Attorney, Agent, or Firm—Woodcock Washburn Kurtz Mackiewicz & Norris

[57] ABSTRACT

The invention is a transducer carriage servo control system and subsystem for a data disk storage system providing markedly improved carriage response time and positioning accuracy. The servo control system uses for feedback control a position error signal having an amplitude dependent at all times upon the amplitudes of both of a pair of normal and quadrature signals indicating actual carriage position. Moving and stationary control is provided through a reference position generator held at a stationary value for stationary (track following) control and incrementally changed for movement control during an access mode of operation. A velocity profile function generator is used to control the incrementation of the reference position in the generator at a nominal modeled velocity rate. Feedback control of incrementation is also provided by the position error signal converted to a velocity error signal through a voltage controlled oscillator. The incrementing system includes a motor adaptive circuit measuring distance moved during an acceleration portion of an access operation and comparing the distance displaced with a predetermined value to further vary the frequency of the velocity error signal, thereby adjusting the modeled servo control system to actual system performance. The motor adaptive circuit is employable with other servo systems utilizing a signal having a variable characteristic for feedback control.

58 Claims, 14 Drawing Figures

POSITION TRACKING SERVO CONTROL SYSTEMS AND METHODS

FIELD OF THE INVENTION

The invention relates to systems and methods for positioning a movable member with respect to a path of movement used with the systems and in particular, to servo control systems for positioning transducers in a data storage device for the transfer of data to or from a data record storage medium of the device.

BACKGROUND OF THE INVENTION

A typical positioning application to which the present invention relates is the positioning of a data transducer or "head" over a selected track of a magnetic disk file in a magnetic disk data storage system. Other uses will be evident to those skilled in the art.

U.S. Pat. No. 4,068,269 to Commander et al. discloses a transducer positioning system for a magnetic disk data storage system incorporating plurality of disks and associated magnetic transducers or "heads" for reading and writing data on each disk. The transducers are ganged for simultaneous movement by a single actuator. A single "servo" disk surface and associated "servo" transducer are dedicated to transducer positioning control. The dedicated servo disk surface is prerecorded with a plurality of concentric magnetic servo tracks of substantially uniform width which are arranged in alternate radial sectors and staggered radially in an alternating fashion from one another. Each magnetic servo track is provided with at least one change in direction of magnetization. As the servo disk surface is rotated, the servo transducer generates a signal indicative of the magnetic transitions occurring in the servo tracks opposite it. The transducer generated signal is passed through appropriate circuitry which generates a first or "normal" position signal and a second, "quadrature" position signal. The position signals are oscillatory about a zero voltage and 90 degrees out of phase with one another. Each of the two position signals is associated with one of the two alternating sets of servo tracks. Each of the position signals is linear for approximately one quarter track width to either side of the boundary of adjoining tracks in the set of sectors with which the signal is associated. The two position signals are alternately linear as the servo head is moved radially across the servo disk surface. The normal position signal, which is selected to be linear about each on-data track position, is used for transducer position control during track following operations when data is being read onto or from the disks.

A positioning system must also control transducer movement between data tracks (and corresponding servo tracks) in an "access" or "seek" operation. The time taken to move the heads between selected tracks in such a mode is generally known as the "access" time and is one of the more important performance characteristics of the positioning system. To minimize the access time for a given mechanical configuation and actuator performance requires a positioning system which will control head movement velocity at an optimal level and bring the transducer accurately to rest on the desired track.

In the aforesaid U.S. Pat. No. 4,068,269, access motion by the transducer is accomplished by means of a continuous distance to go signal generated by counting down the number of tracks between the original position of the servo transducer and desired position of the servo transducer using track crossing pulses generated by logic identifying the alternating linear portions of the normal and quadrature position signals. The derived distance to go signal is passed to a reference velocity signal generator which outputs a time-optimal reference velocity signal which is compared with the actual head velocity signal derived by differentiating and piecewise combining the successively linear portions of the normal and quadrature position signals.

In U.S. Pat. No. 4,115,823, also to commander et al., there is described yet another positioning system for use with a disk data storage apparatus similar to that just described wherein the normal and quadrature position signals generated by a dedicated servo transducer and disk surface are combined with servo position signals generated by a data transducer from servo signals mixed with data signals on the data disk surface. Again, the linear portions of the two position signals are alternatively differentiated and combined to generate a velocity signal used in head control.

There are several limitations associated with the positioning systems described in the U.S. Pat. Nos. 4,068,269 and 4,115,823. First, only one-half of the available servo position information is utilized as only the linear portions of the normal and quadrature position signals are used in positioning the transducer. Next, servo track widths are identical to data track widths. As data track widths are made narrower by various techniques to increase data density, the servo tracks must be similarly narrowed. As the servo tracks are contiguous and extend entirely across the servo disk surface, this becomes more expensive to accomplish. Moreover, as data and servo tracks are recorded with narrower widths, the described positioning systems become more susceptible to mechanical perturbations such as eccentricity which may drive the servo transducer into the non-linear region of the normal position signal or trip the transducer onto an adjoining servo track.

Other disadvantages arise in the described systems. Accurate positioning becomes difficult during transducer movement because noise in the system becomes predominant when the positional signal is differentiated at low velocity, as when the transducers are approaching their final position. In differentiation type systems such as have been described, variations in the level of the position signal can similarly cause difficulties. Such variations may be caused by fluctuations in transducer fly height with respect to the disk. As a result, the smoothness of the disk's surface must be held to very tight tolerances. Each of the described Commander et al. systems is also sensitive to position signal wave form linearity. Any deterioration of the servo head or associated electronics can effect the linearity of the positional signal wave forms and cause serious control problems. This requires the imposition of stringent manufacturing tolerances with respect to the components associated with the servo control system.

Bandwidth requirements imposed on positioning control systems during access-type operations may be significantly reduced by the use of feedforward control. U.S. Pat. No. 4,200,827 to Oswald describes a feedforward/feedback transducer positioning system used in a magnetic disk data storage device. In feedforward control, a primary current is applied to the actuator moving the heads. The primary current is one which would accomplish an optimal or near-optimal movement of the heads in an ideal or nominal model of the electromechanical servo mechanism being used. Variations between the actual performance of the system and the modeled or ideal performance upon which the primary current is based is compensated for by introducing small perturbations into the primary current as feedback control.

U.S. Pat. No. 4,200,827 describes a "bang-bang" access servo control system in which the heads are moved by the control system at near the maximum acceleration and deceleration which the electrical and mechanical components of the system can tolerate. For long access movements, the heads "coast" at maximum velocity between acceleration and deceleration modes. The control system generates a drive current (or feedforward current) which can be controllably switched in sign for movement of the heads in either direction along a radius of the disks. Before being fed to the actuator motor moving the heads, the drive current is combined with a feedback control current proportional to error occuring in the access operation. Two embodiments are described, one utilizing velocity error and the other utilizing position error to generate the feedback control current. In the former embodiment a transducer head velocity signal is generated by differentiating a single cyclically varying servo position signal (i.e. normal position signal) generated by a dedicated servo transducer and associated servo disk surface. During the non-linear portions of the servo position signal, actuator current, which is proportional to acceleration, is integrated and used as a measurement of velocity. In the latter embodiment, one or two periodic servo head position signals (i.e. normal or normal and quadrature signals) are generated by the dedicated servo head and associated servo disk surface. A reference position signal is generated by integrating a reference velocity signal. The reference position signal is then phase compared with the servo head position signal to generate a position error signal and a proportional position error current which is combined with a drive current, as in the velocity controlled system, to provide a varying current to the actuator. In a preferred embodiment of the position error control system, both normal and quadrature servo head position signals are generated and the linear portions of each phase compared in a sequential, alternating fashion (as was done in the Commander '269 and '823 patents) with corresponding normal and quadrature reference position signals. The latter are generated by integrating and then phase shifting a single velocity reference signal.

As the invention of the U.S. Pat. No. 4,200,827 patent determines servo position by combination of normal and quadrature signals in the manner of the two aforementioned Commander et al. patents, it suffers the same drawbacks. Additionally, where velocity error is used as the feedback control mode, actuator motor performance must be tightly controlled to predicted nominal conditions or errors are introduced to the measured head velocity signal generated by integration of the motor current. This error is cumulative during each access operation and makes landing on track at the end of the operation problematical at best. As a result, very tight manufacturing and reliability tolerances are imposed on the actuator motors which must be used with this system.

U.S. Pat. No. 4,297,734 to Laishley et al. describes yet another servo positioning system for data disk systems utilizing feedforward plus feedback control with sampled, rather than continuously generated normal and quadrature servo position signals. This control system is subject to the same problems which beset the previously identified systems, particularly the requirement that actuator motor performance be tightly controlled during manufacture and monitored over the life of the system. As servo position is only periodically sampled and not continuously monitored, small variations of the actual actuator motor performance from modeled motor performance can introduce significant errors degrading feedback control.

OBJECTS OF THE INVENTION

It is an object of the invention to provide a servo control method and apparatus for controlling the movement and positioning of a moving member which has decreased sensitivity to variations in the performance characteristics of the servo system components.

It is yet another object of the invention to provide a servo positioning control method and apparatus using only measurement of servo position for moving member control during movement whereby the differentiation of servo position or the integration of actuator current to generate a servo velocity representation is avoided.

It is yet another object to provide a servo control method and apparatus for controlling the positioning and movement of a movable member using a position error control signal, the magnitude of which is dependent at all times upon the magnitudes of both of a pair of cyclical and phase related servo position signals indicating actual position of the movable member.

It is yet another object of the invention to provide such a servo control method and apparatus further including feedforward and feedback control during the movement of the movable member.

It is yet another object of the invention to provide a new servo method and apparatus for feedforward control of a moving member which is self-adapting to the actual performance of the servo system.

It is yet another object of the invention to provide a method and apparatus for adapting a servo control system to the actual performance of the servo system.

SUMMARY OF THE INVENTION

The invention is described in terms of a disk data storage system incorporating a new servo control system utilizing position error feedback control for extremely rapid and accurate positioning of data transducers with respect to the data disk. The described, preferred embodiment of the invention is implemented by means of discrete circuit elements for parallel processing and the fastest possible response time, but it is recognized that one or more microprocessors may be substituted for the individual elements to achieve similar accuracy but with a longer response time. The described disk data storage system includes a plurality of data disks mounted for simultaneous rotation, a plurality of transducers for at least reading data recorded on the disks, a carriage mounting the transducers for simultaneous radial movement with respect to the disks, a voice coil motor coupled to the carriage for moving the carriage and a control system generating a motor drive current supplied to the motor for controlling the positioning of the carriage. A disk surface and an opposing transducer are allocated for servo control. Recorded on the surface are servo signals which define a plurality of contiguous servo segments or "bands" on the surface in the radial direction and indicate incremental position within a band when the system is operated. The signals are recorded so as to be detectable by the dedicated transducer from any other information which may be recorded on the dedicated disk surface. It is envisioned that the control system may be implemented in any of a wide variety of applications which, broadly stated, include a member movable along a defined path of movement, means for dividing the path of movement into a series of contiguous segments, means for indicating actual incremental position of the member with respect to segments, actuator means coupled to the member for movement and a control system of the type to be described, controlling the operation of the actuator.

A most important aspect of the invention is the control system which employs position error feedback control. The components of the described, preferred embodiment control system include a digital resolver controller having an incrementable counter for storing a digital reference position indicating an approximate position of the servo transducer with respect to the servo bands. The digital reference position includes an integer portion indicating an integer number of bands, and a fractional portion indicating an incremental position within a band. The control system also includes a position detector circuit coupled to the servo transducer for generating from the detected servo signals a pair of so-called "normal" and "quadrature" position signals. The two position signals are both trigonometric, having the same oscillatory form, and a fixed phase displacement with respect to one another, and together indicate unambiguously the actual incremental position of the servo transducer with respect to a servo band. The remaining portion of the digital resolver controller is dedicated to circuitry generating a position error signal indicating a phase difference between the actual incremental position indicated by the two transducer position signals and the approximate incremental position indicated by the fractional portion of the digital reference position. Unlike other position control systems, the magnitude of the position error signal is dependent at all times upon the magnitudes of both of the two transducer position signals. In particular, the fractional portion of the digital reference position value is converted into a pair of trigonometric function values which are multiplied with the position signals and combined to generate a trigonometric position error signal having an oscillatory, phase dependant form, the phase being the difference between the two incremental positions in phase format. The servo control system also includes circuit elements responsive to the position error signal for generating a drive current supplied to the motor for positioning the carriage.

The system described thus far can be used to hold the carriage at a fixed position by equating the digital reference position to the fixed position. For movement of the carriage an updating subsystem is provided for controlled variation of the stored reference position. In particular, the updating subsystem increments the counter storing the reference position value from an initial position value to the final position value. The updating subsystem in the described embodiment includes a summing subcircuit formed by a plurality of stacked adders which sum the stored reference position value with a predetermined complementary value related to the desired final position such that when the digital reference position is equal to the final reference position, the sum equals a predetermined value. The output of the adders in the summing subcircuit is indicative of the distance between the stored reference position and the commanded or final position. The updating subsystem further includes programmable read-only memories responsive to the distance indication outputted by the summer circuit. The memories are programmed to output a scaling function, also referred to as the velocity profile function, which has a magnitude dependent upon the magnitude of the summer circuit output and thus distance between the indicated reference position and final position. In particular, the velocity profile signal also has a magnitude proportional to the magnitude of a desired nominal velocity of the carriage when undergoing a time optional movement and located at a distance from a desired terminal position equivalent to the distance between the stored digital reference position and the commanded final position. The updating subsystem also includes a rate multiplier outputting a cyclic signal having a cycling frequency related to the magnitude of the velocity profile function. The cyclic signal is used to increment the counters storing the digital reference position.

Because of a tendency for the described system to increment the digital reference position during the acceleration portion of a carriage movement faster than the actuator can respond to the position error signal, the updating subsystem includes an override circuit which reverses the direction of incrementation of the stored reference position away from the commanded, final position when the absolute value of the position error magnitude approaches a predetermined value. In the described embodiment, this is accomplished by providing a pair of voltage comparators, having as their input the position error signal. Output from the voltage comparitor is used to generate a signal to the counter storing the digital reference position which controls the direction of incrementation of the counters. Other implementations of the update circuit are known to be possible.

To reduce system bandwidth requirements, the positioning system includes feedforward control. A feedforward seek drive circuit is provided to generate a feedforward drive signal for gross control of the positioning system during a seek movement. The seek drive circuit provided includes a programmable read-only memory responsive to the velocity profile signal previously referred to. The PROM stores a table of deceleration values also referred to as feedforward scaling functions, which correspond to the magnitude of an electric current needed for driving a model positioning system utilizing a nominal, model actuator in a time optional motion. A reference voltage signal is generated which switches in sign between acceleration and deceleration in response to components of the position error signal. The reference voltage signal and feedforward scaling function are combined to generate a drive signal. The described embodiment further provides a gain control circuit for reducing the gain of the position error signal during a seek operation and a summing junction for combining the gain control position error signal with the feedforward drive signal to create a composite drive signal actually used to generate a drive current for the motor. While gain of the position error signal is reduced during a seek movement operation, it is not entirely removed as it is believed that the presence of the signal, even at a reduced level, provides a smoothing effect as the carriage approaches the final position.

The described embodiment additionally uses the position error signal as feedback control for the reference position incrementing step. This is accomplished by providing a voltage control oscillator outputting a cyclic signal having a nominal cycling frequency and varying about the nominal frequency in relation to the magnitude of the position error signal. A sign change circuit passes or inverts, depending upon the direction of motion of the carriage, the position error signal forwarded to the oscillator to relate the passed signal to a velocity error as opposed to a position error. The implementation of position error signal feedback control in the reference position incrementing process reduces the likelihood of a cycle limiting condition occurring.

Another important aspect of the invention is a motor adaptive circuit provided between the voltage control oscillator and the aforesaid incrementing rate multiplier to further vary the frequency of the cyclic signal outputted by the oscillator in relation to the actual performance of the positioning system. In this way, systematic long-term errors arising from manufacturing tolerance variations, wear or other deterioration of the positioning system components can be separately corrected for, thereby providing a full range of positioning control tailored to the actual components of the positioning system. The described embodiment operates by measuring displacement of the reference position over a predetermined time period during an acceleration portion of the carriage movement, and computing a ratio of the measured displacement of the system against the maximum possible displacement achievable by the fastest possible positioning system. The ratio is fed into a second rate multiplier and is used to scale the frequency of the voltage control oscillator signal before it is passed to the incrementing rate multipier also receiving the velocity profile function as an input.

The motor adaptive circuit constitutes a second and separable aspect of the invention. It is envisioned the circuit can be used with other dynamic servo positioning systems which utilize an error signal for feedback control having a signal variable indicative of the error occurring during the movement.

These and other important aspects of the invention will be understood upon examination of the accompanying figures and detailed description of the preferred embodiment of the invention.

BRIEF DECRIPTION OF THE FIGURES

A preferred embodiment of the invention will now be described with reference to the accompanying drawings in which.

DETAILED DESCRIPTION OF THE INVENTION

Overall System

Figure 1:
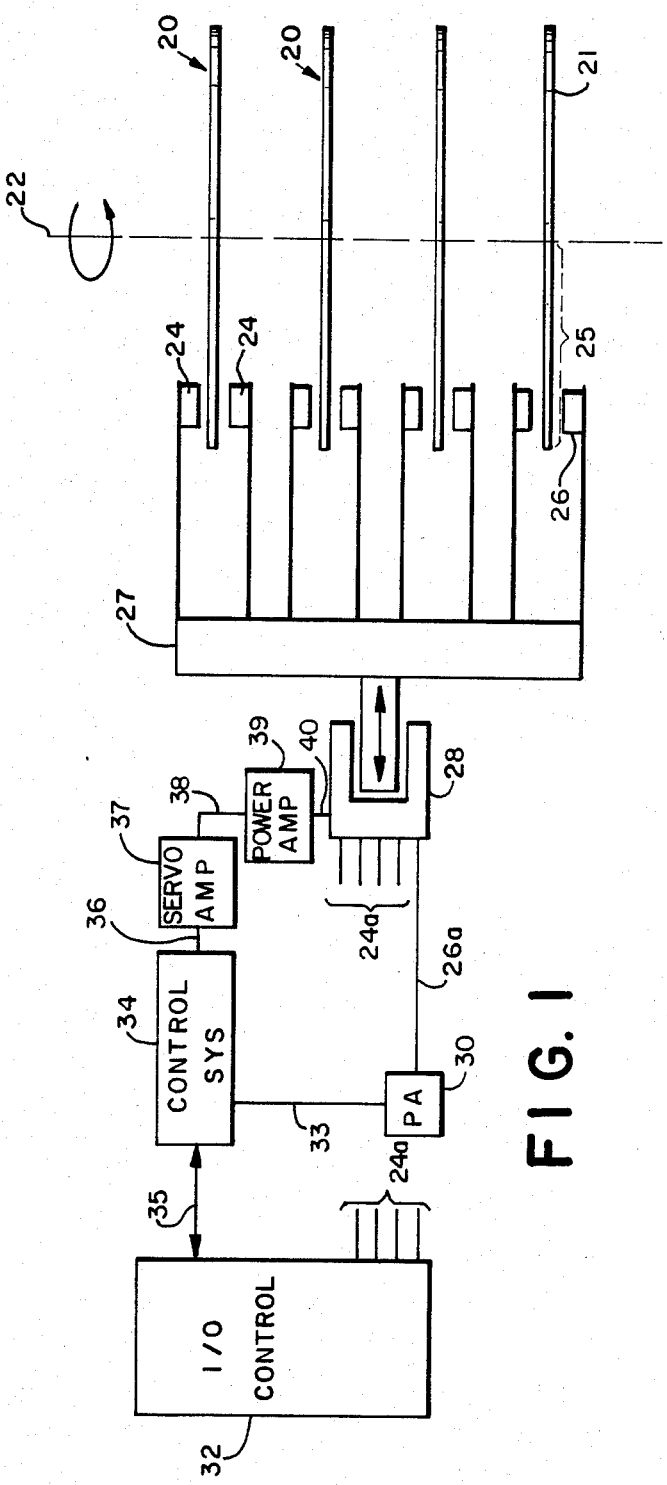
FIG. 1 shows schematically a disk data storage apparatus incorporating the invention.

A data disk storage apparatus incorporating various embodiments of the invention hereinafter described is shown schematically in FIG. 1. A plurality of magnetic disks 20 are mounted in a stacked orientation for rotation about a central axis 22. A data transducer or head 24 is associated with the upper or lower surface of each disk 20 for recording data on or reading data from the disk. One disk surface 21 is allocated to servo control and has servo positioning information recorded thereon. A servo transducer or head 26 is associated with the servo surface 21. The transducers 24 and 26 are ganged on a carriage 27 for simultaneous radial movement with respect to the disks 20 by an actuator motor 28. Movement enables the data transducers 24 to access different data tracks. The data transducers 24 are positioned using position information supplied by the servo transducer 26 and servo disk surface 21. Positional information is derived from signals generated by the servo transducer 26 in reading prerecorded servo bands (indicated at 25) on the servo disk surface 21. Signals generated by the servo transducer 26 are passed via line 26a to a preamplifier 30, the output of which is passed via line 33 to control system 34 which will subsequently be described in greater detail. The function of the control system 34 is to provide suitable drive current to the actuator motor 28 to move the ganged transducers 24 and 26 between servo track positions so as to align the data transducers 24 with selected data tracks (a seek operation) or to maintain the transducers 26 and 24 on a selected track position during data recording and playback (a track following operation). Data signals are passed to or received from the data transducers 24 along lines 24a by appropriate circuitry which is not described and is not part of this invention. The servo transducer 26, carriage 27, preamplifier 30, control system 34, servo amp 37, power amp 39 and actuator 28 (preferably a voice coil motor) form a closed loop servo system. An appropriate input/output control device 32, which is also no part of the present invention, provides the identity of the servo track locations to be accessed by a digital signal sent along a channel 35 to the control system 34 and interfaces with the data transducers 24 along the lines 24a. Certain control signals are passed from the servo control system 34 to the I/O controller along other lines also represented schematically by the line 35 in FIG. 1.

Servo Position Encoding

Figure 2:
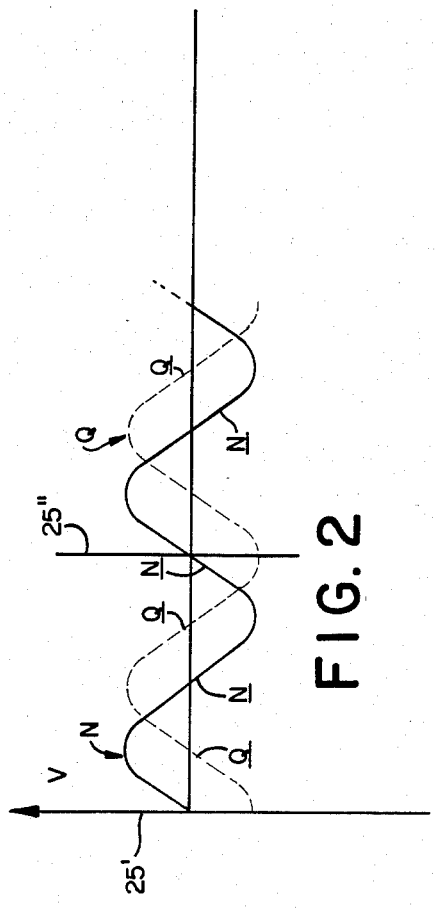
FIG. 2 shows the wave forms generated from recorded servo signals detected by a servo transducer and an associated position detecting circuit; the wave forms are a pair of cyclical, sinusoidal transducer position signals having a fixed phase relationship with respect to one another and indicate the incremental position of the servo transducer with respect to a servo band.

It is necessary for the operation of the described embodiment that the servo bands 25 provide both normal and quadrature positional information whereby the incremental (or phase) position of the servo transducer 26 with respect to the boundaries of the servo bands 25 can be determined. There are many servo encoding schemes which can be used to provide such information. One such scheme is described in the aforesaid U.S. Pat. No. 4,068,269 to Commander et al. which is incorporated by reference herein in its entirety. FIG. 2 depicts the two cyclical position signals, a normal signal N and a quadrature signal Q, derived from the output of the servo transducer 26 as it moves at a uniform radial velocity across the servo surface 21 and bands 25. The two signals, N and Q, are approximately sinusoidal, 90° out of phase and vary 360° over a set of servo track pitches. Vertical axes 25' and 25" mark the boundaries of a typical band 25. When the servo transducer 26 is held in a stationary position over the disk surface, the values of the normal signal N and quadrature signal Q generated through the transducer 26 are constants. In the prior art, the linear sections of each of the signals N and Q, i.e. sections N of the N signal and Q of the Q signal, were piecewise combined to create linear position and velocity signals. One important aspect of the present invention is the combination of the normal signal N and quadrature signal Q so as to identify, with any desired resolution, the position of the servo transducer 26 with respect to the servo band boundaries (i.e. its phase or incremental position). This allows the servo bands 25 to be several times larger, radially, than the data tracks. It further reduces the sensitivity of the servo system to errors generated by non-linearities arising in the servo position encoder portion of the control system. After amplification in the preamp 30, the servo position signals detected by head 26 from servo surface 21 are passed on line 33 to the servo control system 34.

Servo Control Circuit

Figure 3:
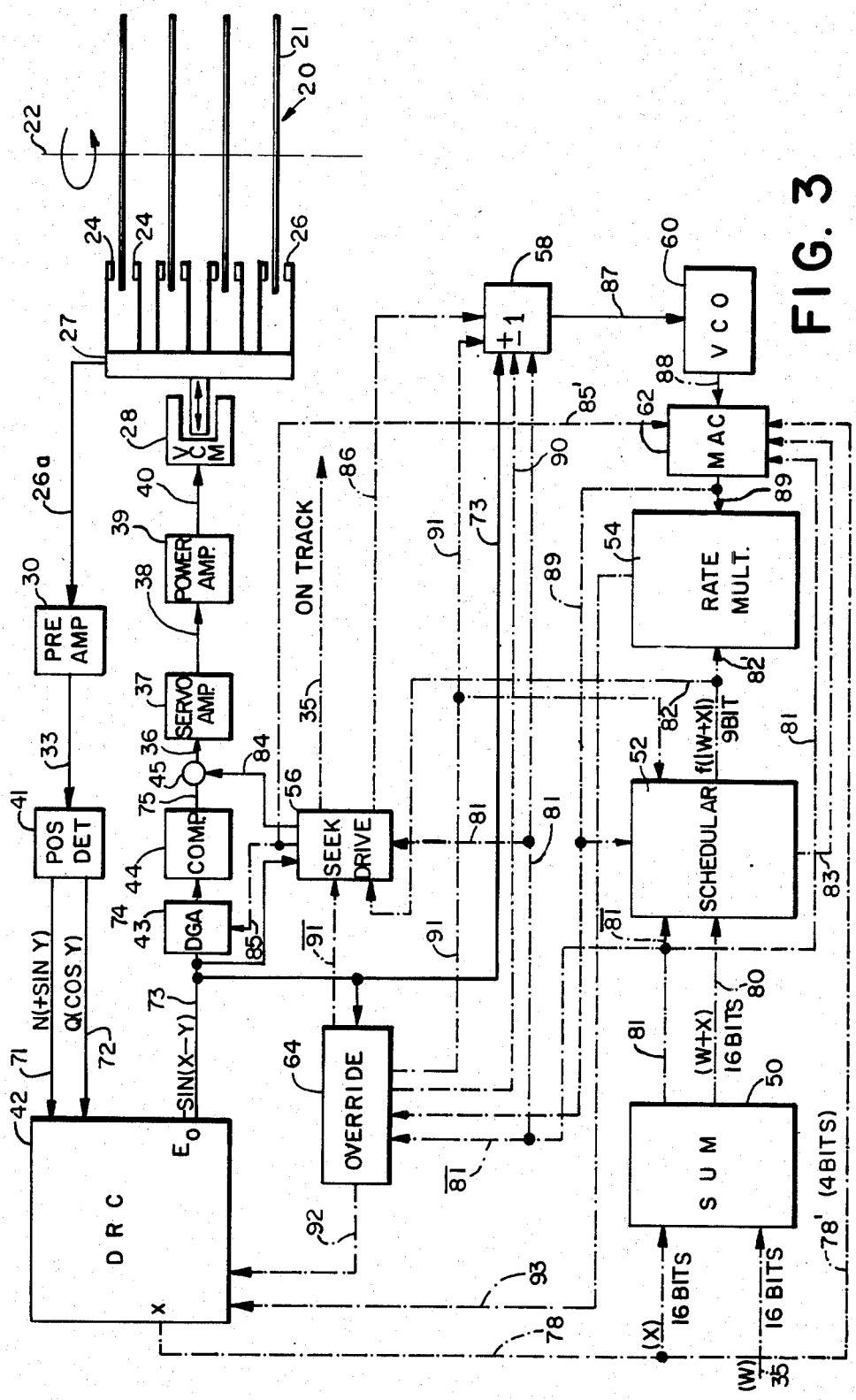
FIG. 3 depicts schematically the major components of the preferred control system of the present invention.

FIG. 3 depicts in block diagram form, a preferred embodiment of the control system 34 of FIG. 1 incorporating feedforward and feedback control. The system 34 comprises a position determination circuit 41, a digital resolver controller ("DRC") 42, a dual gain amplifier ("DGA") circuit 43, a compensator ("COMP") circuit 44, a signal summing junction 45, a summer ("SUM") circuit 50, a scheduler circuit 52, a rate multiplier 54, a feedforward seek drive ("FFSD" or simply "seek drive") circuit 56, a sign inversion ("±1") circuit 58, a voltage controlled oscillator ("VCO") 60, a motor adaptive circuit 62 and an override circuit 64. Analog signals are passed on the lines indicated in solid while digital signals are passed on channels indicated in dash dot.

Servo Position and Position Error Determination

The position determination circuit 41 accepts the amplified servo transducer 26 signals and generates from those signals, analog normal ("N") and quadrature ("Q") transducer position signals. The construction and operation of the position determination circuit will be dependent upon the position encoding scheme employed and the nature of the signals recorded on the servo disk surface 21. The aforesaid U.S. Pat. No. 4,068,269 describes a suitable circuit equivalent to the position determination circuit 41 for use with its described encoding scheme. The normal and quadrature signals outputted by the system of that patent are approximately equal to sin y and cos y, respectively, where y is the incremental (phase) position in the radial direction of the servo head 26 with respect to (i.e. within) a servo band boundary. Because the normal and quadrature functions are continuous from servo band to servo band, the position which they define is also continuous. There is no need to piece together linear portions of each of the two signals. Within each servo band, the normal and quadrature signals uniquely define the position of the servo head 26 in a continuous manner making it possible to servo to any position on the servo surface 21 with equal facility. The two position signals N and Q are passed to the DRC 42 on lines 71 and 72.

The DRC 42 has suitable circuitry, preferably one or more up/down counters, to store and output a digital signal indicating a reference position, x, the position x being an integer and fractional representation of servo head 26 radial position with respect to the servo tracks recorded on disk surface 21. The DRC 42 accepts the analog normal signal N and quadrature signal Q from the position determination circuit 41 and generates an analog, trigonometric position error signal $E_o$ [$= -\sin(x-y)$] representing the phase difference between the actual servo head incremental radial position y, indicated by the servo signals N and Q (i.e. sin y and cos y, respectively), and the fractional portion of the reference position x. The analog position error signal $E_o$ is passed along line 73 through the dual gain amplifier 43 along line 74 to the compensator 44 which comprises lead/lag circuitry conventionally provided to modify the phase of the position error signal $E_o$ to assure stability of the servo loop. The compensated error signal is passed by the compensator 44 along line 75 through the summing junction 45 and along line 36 to the input of the servo amplifier 37, the output of which is fed on line 38 to the power amplifier 39 supplying current on line 40 to the actuator motor 28. The servo amplifier 37 and power amplifier 39 are conventional and designed to accommodate the characteristics of the actuator/carriage combination utilized.

Modes of Operation

During a track following operation, the reference position x is held at a constant value (the servo position equivalent to the position of the data track being accessed) and feedback control of servo head position y is provided by the position error signal $E_o$.

Movement of the servo and data heads 26 and 24 to a new position in a seek operation is initiated by the I/O controller 32. The controller 32 generates a digital commanded servo position w passed along line 35 to the servo control system 34 (see FIG. 1). Depending upon the implementation selected by the user to control the seek operation, w can represent the servo head position sought to be reached during the access operation or the compliment of that position such that the sum of w plus the servo head position desired to be accessed, $x_o$, equals some predetermined constant. The preferred embodiment being described uses the latter mode of operation. The summer circuit 50 adds the reference position signal x passed along channel 78 and command position signal w, and passes to the scheduler circuit 52 along channel 80 a digital signal, (w+x) in FIG. 3, indicative of the distance between the desired final servo position $x_o$ and the presently indicated reference position x in the DRC 42. The summer 50 also generates on line 81 a logic level (i.e. high/low) "SIGN" signal, which indicates by its level the radial direction (inward or outward) in which the carriage 27 is to move during the seek. An inverted SIGN signal is passed to an override circuit 64 and schedular 52 on line 81. Based upon the value of the summer circuit output signal (w+x), the scheduler 52 selects and outputs a digital velocity profile signal f(w+x) on channel 82 to the seek drive circuit 56 and on 82' to the rate multiplier circuit 54. The seek drive circuit 56 generates in response to the velocity profile signal f(w+x), a feedforward drive current signal which is passed, via the line 84, to the summing junction 45 and hence, with the positional error signal $E_o$ along the line 36 to the servo amplifier 37. Means are provided in the seek drive circuit 54 to zero the output on line 84 when the system is in a track following mode and during a seek mode when the servo heads are coasting (i.e. moving with maximum velocity). The seek drive system 56 generates a logic level "ON TRACK" signal which is passed on line 85 to the dual gain amplifier 43 and, after a slight delay on line 85', to the motor adaptive circuit 62. The gain applied to the position error signal $E_o$ is reduced except when the servo control system is in a track following mode and the ON TRACK signal is at a high level. The delayed ON TRACK signal is also available from the seek drive circuit 56 to the I/O controller on line 35.

The position error signal $E_o$ is also used to control the rate of change of the reference position x in the DRC circuit 42 during the seek operation thereby providing velocity error servo control. The position error signal $E_o$ is passed via analog line 73 to the sign change ($\pm 1$) circuit 58. Also forwarded to the sign change circuit 58 are the SIGN signal outputted by the summer 50 on line 81, an inverted maximum velocity ("MAX VEL") signal on line 86 form the seek drive circuit 56 and FIRST OVERRIDE and SECOND OVERRIDE signals on lines 90 and 91, respectively, from the override circuit 64. With the knowledge of the direction of carriage motion (indicated by level of SIGN signal 81) and the sign of the position error signal $E_o$ it can be determined whether the reference position x leads or lags the servo indicated position y. The purpose of the sign change circuit is to assure that a position error voltage of the proper sign is passed to the VCO 60 so as to increase the rate of change of the reference position x when that position lags the servo position y, or decrease the rate of change at the reference position x when that position leads the reference position y. The sign change circuit 58 of the preferred embodiment being described also includes an anticipate subcircuit to scale the voltage level of the position error signal $E_o$ to account for inductance in the actuator motor 28 so as to prevent the carriage 27 from overshooting its model deceleration curve profile during short seek operations.

The output of the sign change circuit 58 is applied via the channel 87 to the voltage control oscillator 60 which is of a conventional design. The voltage control oscillator 60 outputs on line 88 a clock (high/low) signal, the frequency of which is controlled about a nominal frequency by the voltage level of the sign change circuit 58 output signal provided on line 87. A positive voltage from the sign change circuit 58 increases the frequency of the clock signal outputted by the VCO on line 88 while a negative voltage decreases that frequency. The magnitude of the signal from the sign change circuit 58 controls the extent to which the VCO clock signal frequency is increased or decreased.

The clock signal from the VCO circuit 60 may be passed directly to the rate multiplier 54 or, preferably as in the embodiment being described, to a motor adaptive circuit 62 located between the output of the VCO circuit 60 and the clock input of the rate multiplier circuit 54. The motor adaptive circuit 62, if provided, modifies the frequency of the VCO clock signal in response to actual performance of the servo system during the acceleration portion of a longer seek operation and passes the modified signal on channel 89 to the rate multiplier circuit 54 during the deceleration portion of the seek. The rate multiplier circuit 54 scales the clock pulse signal it receives on the channel 89 by the value of the scheduled velocity signal f(w+x) it receives from the scheduler circuit 52 via the channel 82' and provides yet a different clock pulse signal via the channel 93 to the DRC circuit 42 to incrementally change the reference position x to program the change in actual position y of the servo head 26.

During a seek operation, the primary portion of the drive signal passed to the servo amp 37 is generated by the seek drive circuit 56. The seek drive circuit 56 generates in response to the value of the velocity profile signal, a drive signal suitable for a model actuator operating to its nominal design specifications. However, control is still provided through feedback of the position error signal $E_o$ at the summing junction 45.

During the acceleration portion of a seek operation, the rate multiplier 54 will update the reference position x in the DRC 42 sufficiently rapidly to cause the reference position x to overshoot the actual servo position y by more than a servo band (i.e. band skip). To prevent this from occurring, an override circuit 64 is provided. In the preferred embodiment being described, the override circuit 64 outputs a logic level signal on line 92 which controls the direction in which the reference position x is incremented (i.e. increased or decreased) by the rate multiplier 54. The override circuit 64 includes suitable circuitry to monitor the magnitude of the position error $E_o$ carried to it on the line 73. When the position error signal $E_o$ exceeds a certain absolute value, the override circuit changes the logic signal on line 92 reversing the direction of incrementation of the reference position x and preventing the reference position x from further overshooting the actual servo position y. When the magnitude of the position error signal $E_o$ is reduced to acceptable levels, the level of the signal outputted by the override circuit 64 on the line 92 is returned to that which allows the reference position x to again lead the servo indicated position y.

Control System Components

Each of the major circuits 42 through 64 will now be described in greater detail.

Position Detection Circuit

U.S. Pat. No. 4,068,269 to Commander et al., previously incorporated by reference, is referred to for a description of a suitable data disk encoding scheme and a position detection circuit 41, identified therein as a "position error detect circuit 25". It will be appreciated that this represents one of many known servo encoding schemes for providing both normal and quadrature position signals which may be employed with the present invention. It is not intended that the present invention be construed to be limited for use solely with that position detection embodiment or servo encoding scheme.

Digital Resolver Controller 42

Figure 4A:
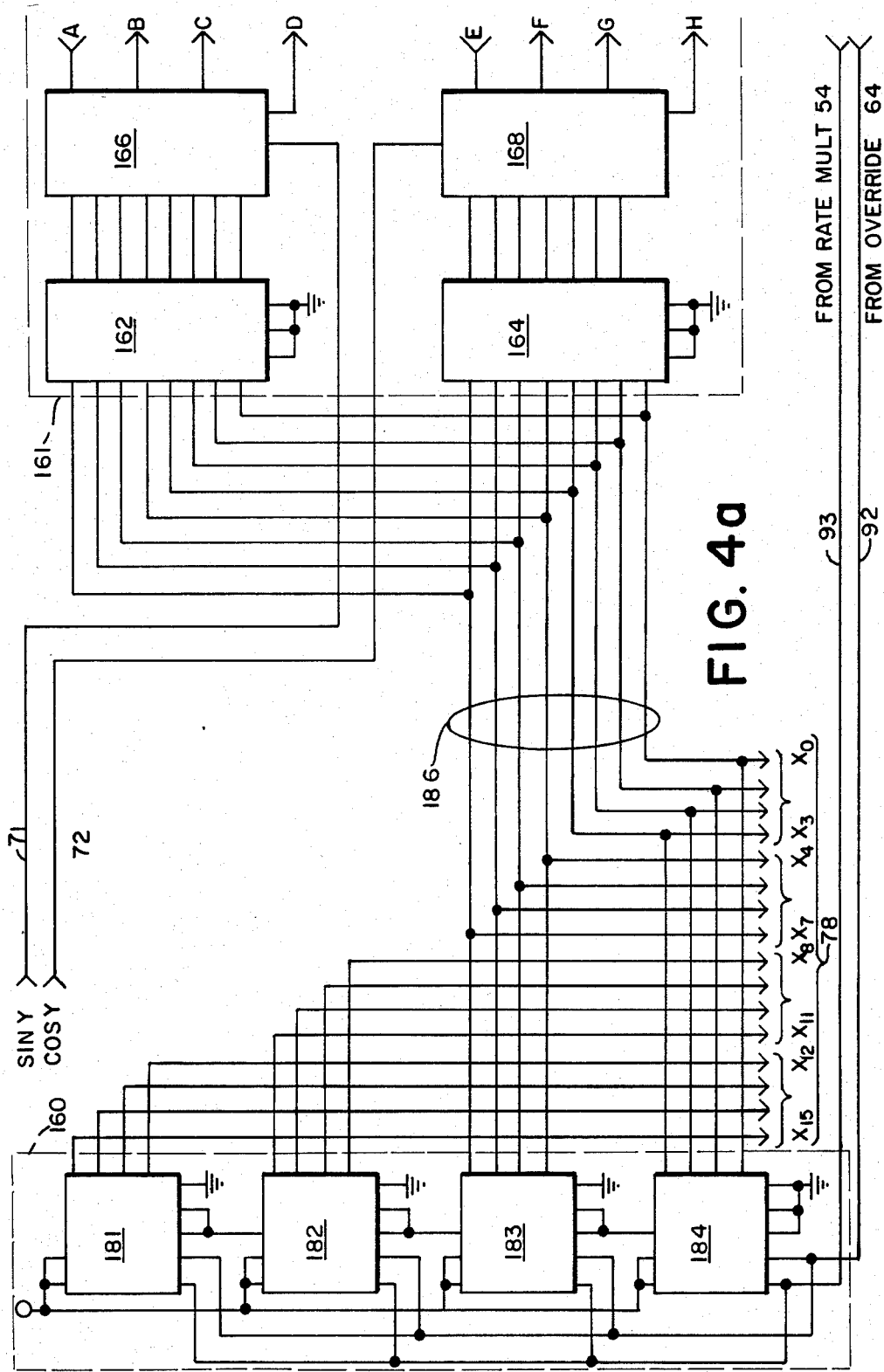
FIGS. 4a and 4b depict schematically the components of a digital resolver controller ("DRC") of the control system.
Figure 4B:
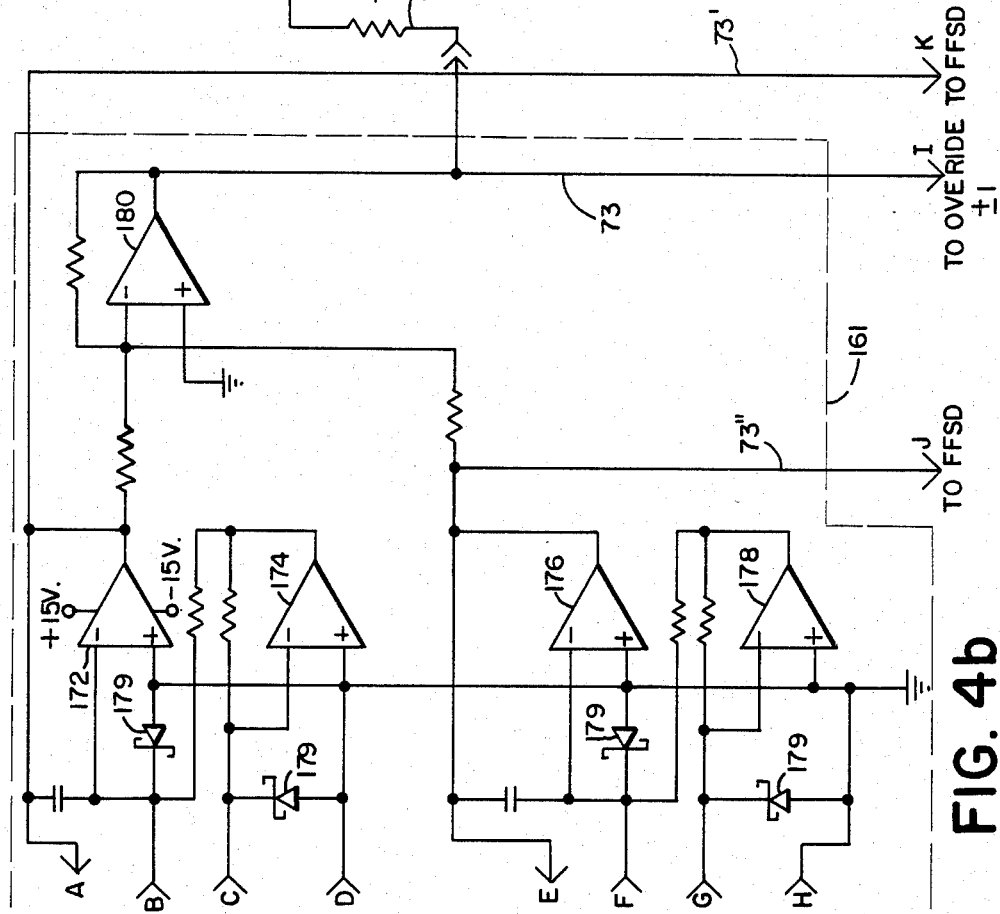

FIGS. 4a and 4b depict the components of the digital resolver controller ("DRC") 42 of FIG. 3. The DRC 42 comprises two major subcircuits: a reference position indicator 160 indicated in FIG. 4a and a position error circuit 161 indicated in FIG. 's 4a and 4b. The reference position indicator 160 stores the reference position x and generates a 16-bit digital reference position signal (referred to as $x_i$). The depicted circuit 160 is formed by four cascaded four-bit digital counters 181 through 184 (type LS 169) providing sixteen bits for reference position x identification. Greater or fewer bits may be provided and the bits may organize as desired for data track and servo track representation. In the embodiment being described, the eight bits provided by the upper counters 181 and 182 identify integer servo bands while the eight bits provided by counters 183 and 184 provide fractional resolution of each individual band, down to approximately 1.4° (or $2.5 \times 10^{-2}$ radians). All sixteen bits $x_i$ are made available to the summer circuit 50 on digital channel 78 (see FIG. 3). In addition, the least significant eight bits (i.e. those of counters 183 and 184), hereinafter referred to as x are made available to first and second function generators 162 and 164, respectively, of the position error circuit 161 via the digital channel 186.

The position error circuit 161 includes the two function generators (programmable read only memories type TBP 18S22) 162 and 164, as well as first and second multiplying digital to analog converters 166 and 168 (type AD 7523), respectively, and five, identical operational amplifiers 172, 174, 176, 178 and 180 (type LF 347).

As the name would imply, the position error circuit 161 generates a position error signal representing the phase difference between the actual servo position y, as indicated by the normal and quadrature position signals N and Q, and x, the fractional portion of the reference position x. Several implementations would be suitable. For high speed applications, a trigonometric relationship is preferred. The position error signal $E_o$ is represented in this embodiment by the relationship:

$$E_o = -\sin x \cos y + \cos x \sin y = -\sin (x-y)$$

but the relationship:

$$E_o = \sin y - \cos y \tan x$$

might also be used where: y is the actual (phase) position of the servo head 26, sin y and cos y are the outputs of the position detection circuit 41 and x is the fractional or phase portion of the reference position x (i.e. the eight least significant bits, $x_0$ through $x_7$). In either case, if x equals y the relationship goes to zero.

The first PROM 162 outputs in response to the digital reference position bits $x_0$ through $x_7$, a digital approximation of the trigonometric function cos x. The second PROM 164 similarly outputs a digital approximation of $-\sin x$. The normal position signal N supplied by the position detection circuit 41 is presumed to be sin y (the circuit 41 should be so implemented), which is fed via the line 71 into the reference input of the first multiplying digital to analog converter 166 while an eight bit digital representation of the cos x is fed from the generator 162 into the digital inputs of the converter 166. The output of the converter 166 is passed to a pair of the operational amplifiers 172 and 174 which, with the indicated circuit elements, convert the currents outputted by lines B and C to produce at the output of operational amplifier 172, an analog voltage proportional to the product (cos x) (sin y). Similarly, the quadrature servo position signal Q (cos y) is fed on line 72 to the reference input of the second multiplying digital to analog converter 168 while an eight bit digital approximation of the $-\sin x$ from generator 164 is fed into the digital inputs of that device. Associated with the second converter 168 is a similar network of circuit elements including the two operational amplifiers 176 and 178, the output of amplifier 176 being an analog voltage output proportional to the product $-(\sin x) (\cos y)$. Schottkey diodes 179 are provided to protect the converters 166 and 168 from transients. The outputs of the two amplifiers 172 and 176 are fed into the negative input of the operational amplifier 180, the positive input of which is tied to ground. The amplifier 180 inverts as well as sums the outputs from amps 172 and 176 providing an analog signal proportional to the value $-\sin (x-y)$, i.e. $E_o$. As is indicated in FIG. 3, the position error signal $E_o$ is carried via line 73 to the dual gain amp circuit 43, seek drive circuit 56, override circuit 64 and sign change circuit 58. As is further indicated in FIG. 4b, for convenience the outputs of the amplifiers 172 and 176 are also carried directly on lines 73' and 73", respectively, to the seek drive circuit so that the signal $-E_o$ might be used in that form. If desired, suitable circuitry can be provided in the seek drive circuit 56 to invert the position error signal, $E_o$, passed on line 73 for use therein.

During the track following mode, the rate multiplier 54 circuit does not output a signal to the counters 181-184 and thus holds the reference position x at a constant value representing the servo position equivalent of the data track desired to be followed. The position error signal $E_o$ from the DRC 42, as modified by the dual gain amplifier 43 and compensator circuit 44, is passed to the servo amplifier 37 controlling the power amplifier 39 supplying current to the voice control motor 28 holding the ganged transducers 24 and 26 in a fixed position.

Dual Gain Amplifier 43

Figure 5:
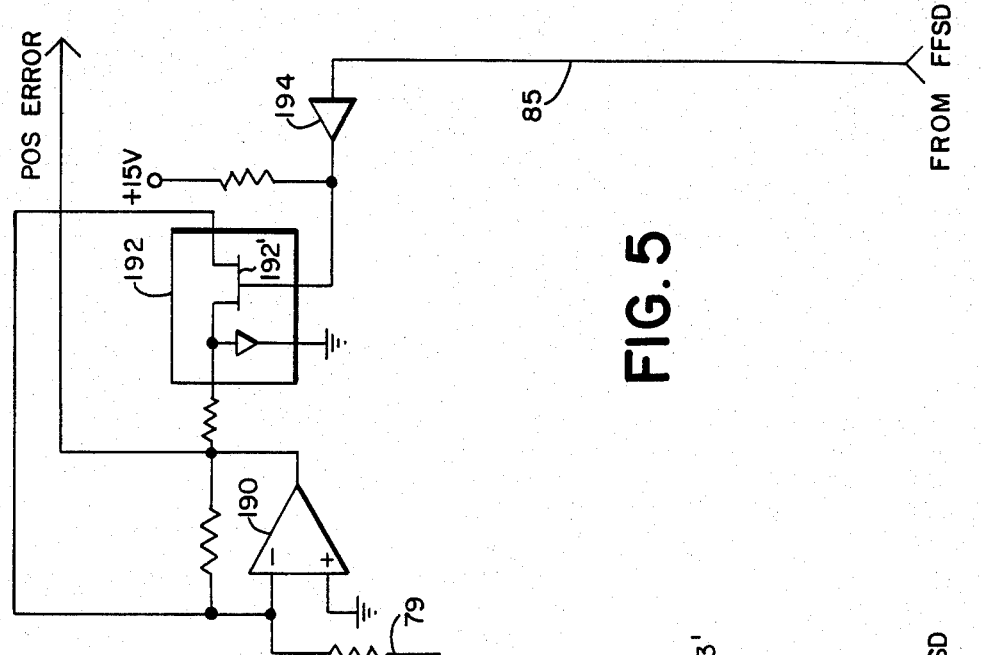
FIG. 5 depicts schematically a dual gain amplifier circuit of the control system.

An exemplary dual gain amplifier 43 is depicted in FIG. 5 and comprises an operational amplifier 190 (type LF 347) receiving the position error signal on line 73 at its negative input, a field effect transistor switch 192 (type IH 5011), a TTL buffer 194 (7407) and various resistors. An ON TRACK signal is passed from the seek drive circuit 56 along the line 85 through the TTL buffer 194 to the gate 192' of the field effect transistor switch 192 controlling its operation. During a seek mode of operation, the ON TRACK signal is low and the switch 192 is closed whereby the gain of the position error signal is reduced. When the ON TRACK signal is high (occurring in a track following mode), the switch 192 is open boosting the position error signal gain. The position error signal $E_o$ is applied to the servo amp 37 during seek operations instead of being eliminated entirely as it is believed to provide a smoothing action when the carriage is approaching the desired servo position during the seek and the servo control system is transitioning from a seek to a track following mode.

One skilled in the art will appreciate that the depicted embodiment is not so sensitive to deterioration of the servo position signals, N and Q, as the prior art references cited. However, it will further be appreciated that the accuracy of the inventive embodiment being described in the track following mode will only be as good as the correlation between the functional representations of the reference position (i.e. sin x and cos x) and the corresponding values of the servo position signals N and Q for the same servo positions. The servo encoding scheme and apparatus described in the aforesaid U.S. Pat. No. 4,068,269 to Commander et al. is biased to maximize the linearity of the servo position signals N and Q. The described embodiment using such a servo encoding and decoding scheme will be most accurate at phase positions separated by 45° (i.e. 0°, 45°, 90°, etc.). Thus in the depicted embodiment, up to eight data tracks may be positioned corresponding to each servo band and followed with equivalent accuracy whereas in the prior art only four data tracks could be provided for each servo band. It will further be appreciated that the resolution of the DRC can be changed by varying the number of digital bits provided for reference position indication and/or the number of bits allocated for reference position phase indication (i.e. fractional portion of reference position x). Further, any values can be included in the function generators (PROMs 162 and 164) of the DRC 42. The track following ability of the system can be made as accurate as desired by modifying the stored functions to correspond to the servo encoder values being generated.

Movement of the ganged transducers 24 and 26 from their existing reference position to a new reference position $x_0$ and thus to a new corresponding data track is accomplished by means of a commanded position signal w supplied from the host computer (not depicted) through I/O controller 32 (see FIG. 1). Control during a seek operation could be accomplished by subtracting the existing reference position x from the control position w and controlling to the null condition (i.e. $w - x = 0$). However, the preferred embodiment of the invention utilizes parallel control logic for increased speed and is most conveniently implemented to provide control on the condition $w + x_0 = $ constant where, for the described embodiment, the constant is $2^{16}$. The 16-bit commanded position w is selected to drive x to the desired servo position $x_0$.

Summer Circuit

Figure 6:
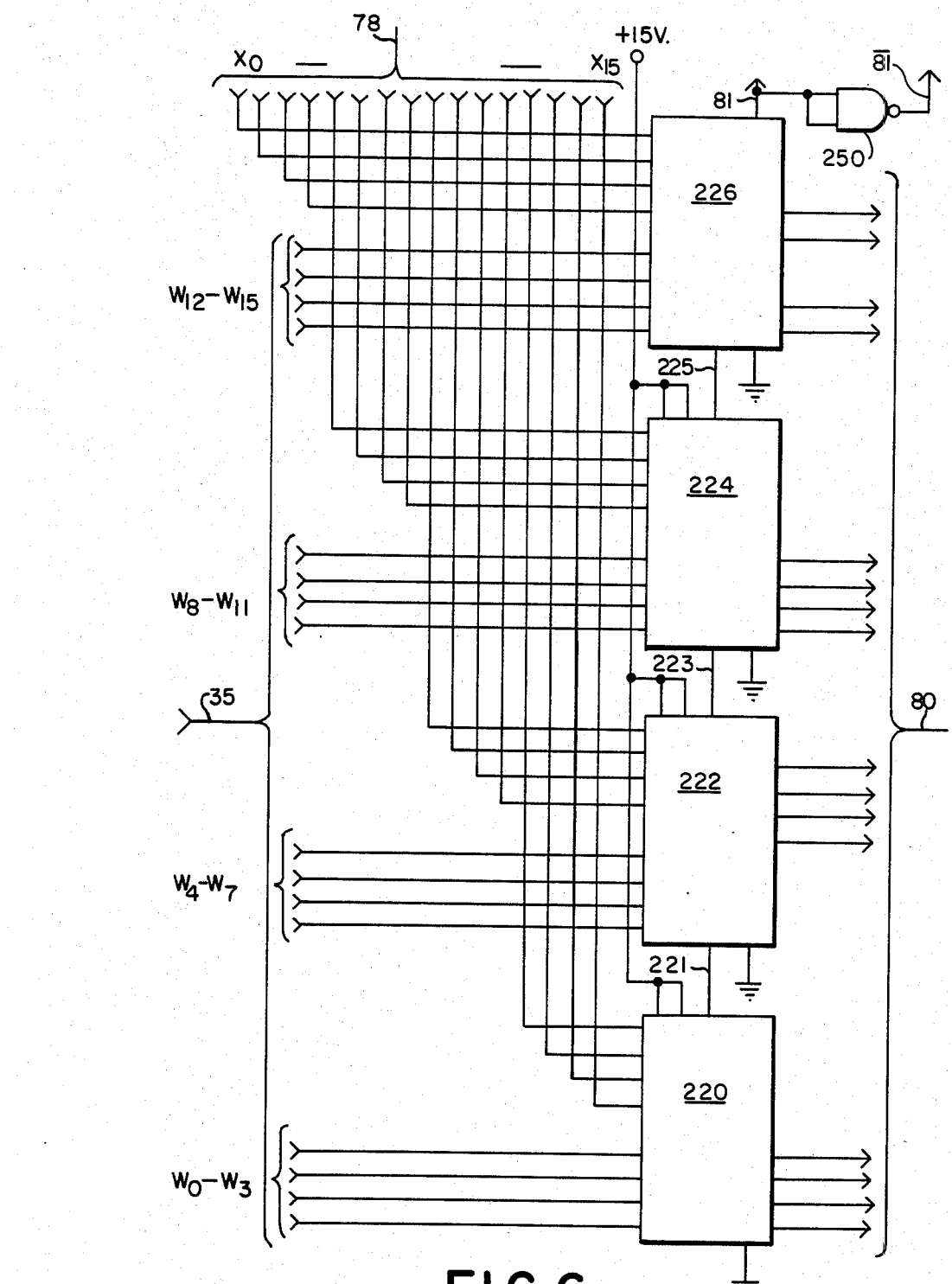
FIG. 6 depicts schematically a summer circuit of the control system.

The summer circuit 50 is depicted in FIG. 6 and implemented to output a digital signal $x + w$. The summer circuit 50 comprises cascaded 4-bit adders (type LS 283) 220, 222, 224, and 226. The first 220 accepts the four least significant bits of the digital command position signal w on line 35 together with the four least significant bits of the position reference signal x on the channel 78 summing those two inputs. A one carry, if present, is passed on line 221 to the second counter 222 which accepts the next four significant digits from the command position signal w and reference position signal x. Line 223 is provided to pass a one carry, if present, to the third counter 224 which sums the next four most significant digits of the two position signals w and x and passes a one carry, if present, to the fourth counter 226 on the line 225. The fourth counter 226 sums the four most significant digits of the two position signals w and x. A one carry provided from counter 226 is passed along line 81 and is hereinafter referred to as the SIGN signal. The SIGN signal indicates by its level, the direction the carriage 27 must move during the seek. The counters 220, 222, 224, and 226 collectively output the 16 bit summed position signal $w + x$ on line 80. This signal represents distance to go between the current reference position x and the desired position $x_0$. At null, the 16 bit outputs of the counters 220, 222, 224, and 226 on line 80 are all zero with a high level SIGN signal on line 81. NAND gate 250 provides an inverted SIGN signal on channel 81. When $w + x$ is greater than $2^{16}$, the SIGN signal is at a high level and the 16-bit summer outputs on line 80 indicate the error. When $w + x$ is less than $2^{16}$, the SIGN signal on line 81 is at a low level (i.e. no carry) and the summer outputs on line 80 are equal to the compliment of the error minus 1.

Schedular

Figure 7:
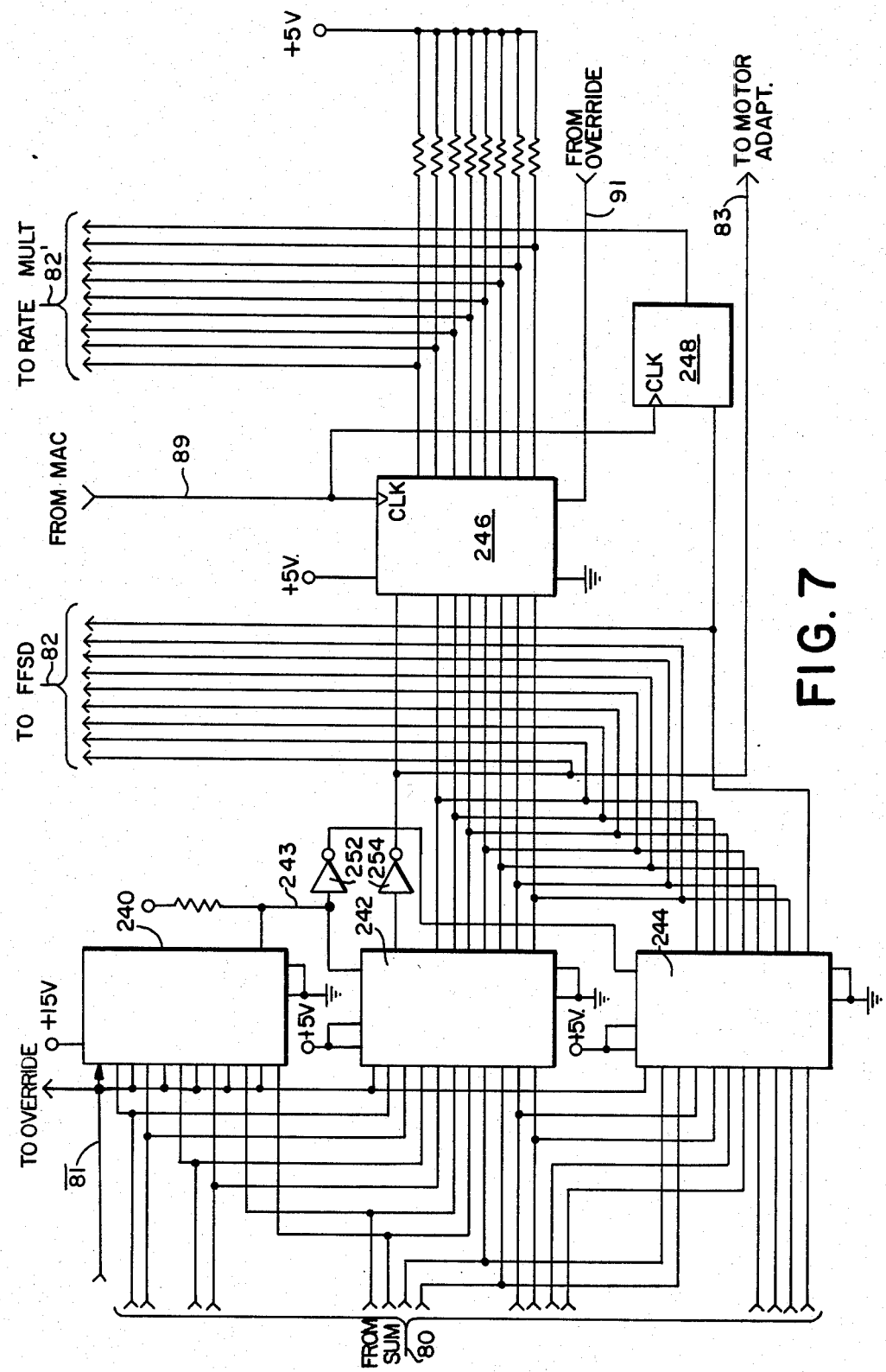
FIG. 7 depicts schematically a scheduler circuit of the control system.

The outputs of the summer circuit 50 are fed on line 80 into the schedular circuit 52, depicted in detail in FIG. 7. The schedular 52 includes a comparator (type 8160) 240, function generators (EPROM type 2716) 242 and 244, a first latch 246 (type LS 374) and a D-type flip/flop 248. Each of the generators 242 and 244 is programmed to provide an appropriate velocity profile signal $f(w + x)$ in response to the summer output signal $w + x$. If desired, a microprocessor could be provided to form the functions of the summer 50, schedular 52 and other of the elements of this embodiment. However, the use of the depicted parallel logic circuit with the look-up table capabilities of the read only memories has two advantages over the use of a microprocessor. The first is that the parallel logic circuits embodiment is faster. The second is that the schedular velocity profile signal $f(w + x)$ can be any arbitrary function since it is held in a table in the memories 242 and 244. This is important as velocity control of the actuator 28 is performed in the present embodiment as a function of position and displacement. With "bang-bang" control, optimum deceleration is given by the equation:

$$2^{16} - (w + x) = v_1 t [v/v_1 + \ln(1 - v/v_1)]$$

where the left side of the equation is distance to go and v is servo head velocity, $v_1$ is the self-limiting head velocity ($= V_{max}/K$) and t is the mechanical time constant ($= MR/K^2$). K is the motor transduction constant, $V_{max}$ is the maximum voltage applied to the voice coil motor, M is the carriage mass and R is the coil resistance of the voice coil motor. This defines x as a function of v but what is needed is v as a function of x, which is not as obvious. The values of v as a function of x (or $w + x$) can, however, be readily determined from this equation and stored in the look-up table of the memories 242 and 244. The values used for K, V, M and R are worst case values (to provide greater than the fastest possible response) so that all drives would be able to remain under control. Two memories 242 and 244 are provided simply to accept a sufficient range of summer signal outputs. The first memory 242 accepts the ten most significant bits of the sixteen bit summer circuit output signal $w + x$ while the second memory 244 accepts the ten least significant bits of that signal. Control over the memories 242 and 244 is maintained by the comparator 240 which receives the six most significant digits of the summer output signal $w + x$ as well as the inverse of the SIGN signal on the line 81. The comparator 240 determines from the six most significant bits and the inverse SIGN signal whether the remaining distance to go is greater or less than 10 bits and activates the appropriate read only memory 242 or 244, respectively, by logic signal on line 243. The signal sent to memory 242 is inverted by inverter 252 and passed to the second memory 244. In the embodiment being described, the first memory 242 controls during longer seeks (i.e. when difference $|2^{16}-|w+x||$ greater than or equal to $2^{10}$ (about 5 milliseconds)) while the second memory 244 controls for shorter seeks and during final approach of longer seeks.

A nine-bit digital velocity profile signal $f(w+x)$ is fed by a selected one of the two read only memories 242 and 244 to the seek drive 56 on channel 82 and to the rate multiplier 54 on channel 82', the latter by way of the latch 246 and flip/flop 248. The velocity profile signal comprises seven bits outputted by whichever memory 242 or 244 is activated by the comparator 240 plus the inverse of the most significant bit outputted by the first memory 242 and the least significant bit outputted by the second memory 244. The most significant bit of memory 242 is also passed, after inversion by gate 254, to the motor adaptive circuit 62 on line 83. The velocity profile signal $f(w+x)$ is clocked out of the latch 246 and flip-flop 248 to the rate multiplier 54 by a clock signal generated by the motor adaptive circuit 62 and passed on line 89. The latch 246 also accepts a signal on line 91 from the override circuit 64 (see FIG. 3) which produces a maximum velocity profile signal, $f(w+x)_{max}$, loaded into the rate multiplier 54 when an override condition is reached.

Seek Drive

Figure 8:
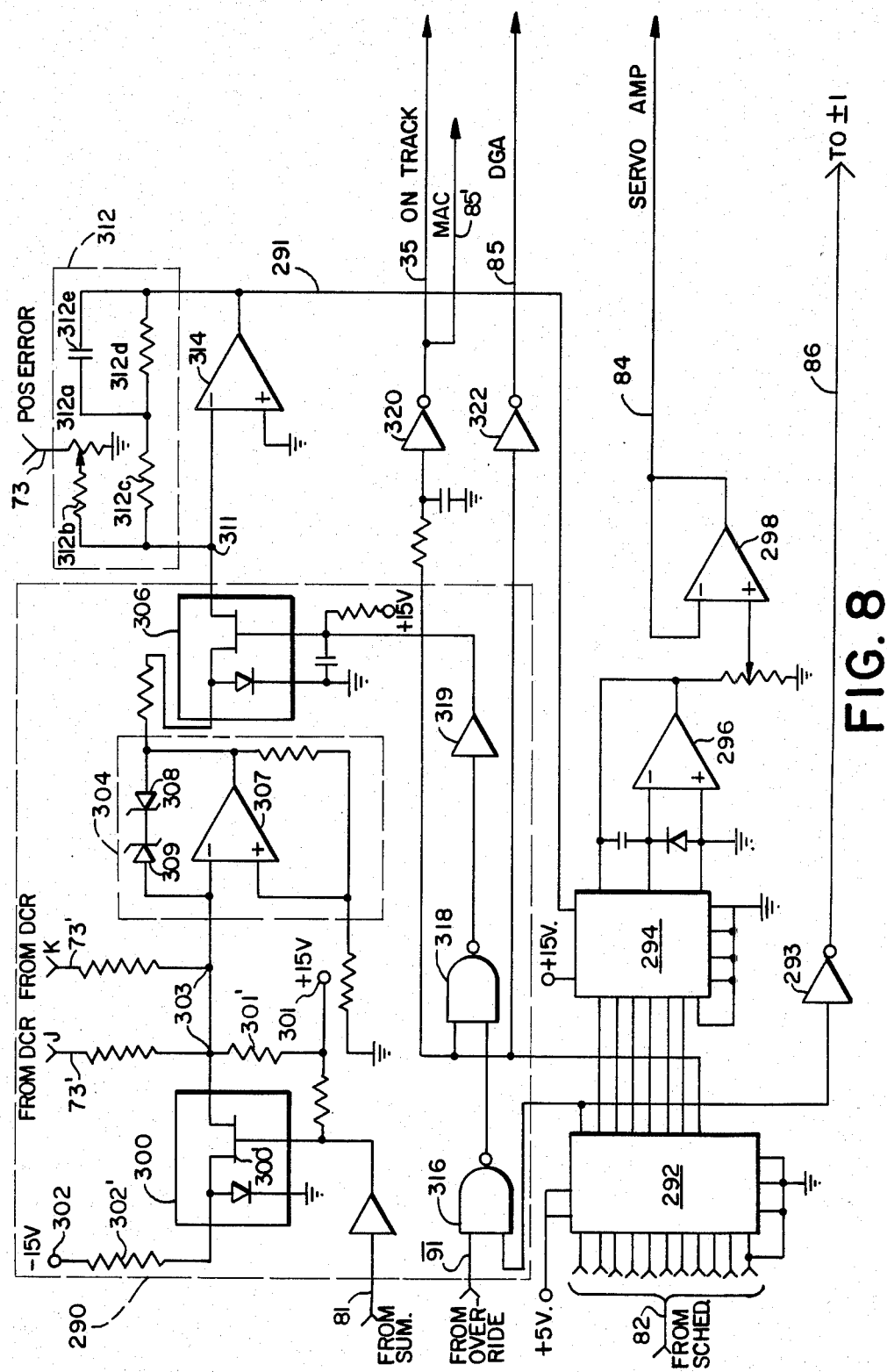
FIG. 8 depicts schematically a feedforward seek drive ("FFSD") circuit of the control system.

The major components of the seek drive circuit 56 are depicted in FIG. 8 and comprise a reference voltage circuit 290, a deceleration function generator (type 2716 PROM) 292, a multiplying digital to analog converter (type AD-5723) 294 with associated operational amplifier 296 and second operational amplifier 298 (both type LF 347). The seek drive circuit 56 produces an anticipated linear motor drive signal during a seek operation for feedforward control. This signal is passed from the amplifier 298 along the line 84 to the summing junction 45 and hence to the servo amplifier 37 and power amplifier 39 so as to control the motion of the carriage 27 during the seek operation. The reference current source circuit 290 produces an analog reference voltage which is modified by elements 312 and 314 and passed on line 291. The modified reference voltage is either positive or negative depending upon the direction of the desired acceleration (or deceleration).

The acceleration and deceleration of the carriage 27 during the seek operation and, therefore, the current used to drive the actuator 28, is a function of the scheduled velocity $f(w+x)$. The following acceleration functions are used:

$a=0$ for $v=v_{max}$ (coasting);

$a=(1/t)(v_1-v)$ for $f(w+x)=v_1 t[v/v_1+\ln(1-v/v_1)]$ and (decelerating);

and $a=kv$ for $v=k[f(w+x)]$ (approaching on track)

where a is acceleration, and v, $v_1$ and t are as previously defined. The function generator 292, which is addressed by the velocity profile function $f(w+x)$, is used to store the deceleration values to produce a digital deceleration function. A zero output is produced by generator 292 during the track following mode, in response to a zero velocity profile function $(f(w+x)=0)$. The function generator 292 also generates an ON TRACK signal for this condition. In the digital to analog convertor 294, a product of the digital deceleration function outputted by the generator 292 and the modified analog reference voltage on line 291 is produced. This product is the feedforward drive signal outputted by amplifier 298.

By providing the feedforward drive signal, feedback control using the position error signal, $E_o$, can be reduced. During seek operations, in gain of the position error signal $E_o$ is reduced in the dual gain amplifier 43 in response to the level of the ON TRACK signal generated by the function generator 292. Providing feedforward control also reduces the operating range requirements on the voltage control oscillator circuit 60 allowing a simple single integrated circuit to be used, as will be later described.

The components of an exemplary reference current circuit 290 comprise a first switch 300, a toggling amplifier 304 and a second switch 306 passing the initial reference voltage during acceleration and deceleration modes. The first switch 300 is an FET type IH 5011 and is controlled by the SIGN signal outputted by the summer 50 on the line 81 which is applied to the gate 300' of the transistor forming the switch 300. The resistor 302' associated with the negative voltage source 302 ($-15$ V) has a magnitude one-half that of the resistor 301' associated with the positive voltage surface 301 ($+15$ V). Thus, when the switch 300 is open (SIGN signal is high) a positive current produced by the source 301 and resistor 301' is fed to the inverting input of toggling amplifier 304. When the switch 300 is closed (SIGN signal is low) a negative current is produced. The switch 300 signal selects the appropriate current sign (positive or negative) for decelerating the carriage 27 during the seek operation. The current outputted by the switch 300 and resistor 301' is summed at the locations 303 with a current proportional to the position error signal outputted directly by amps 172 and 176 on lines 73' and 73'' (see FIG. 4b) and the composite current is fed into the amplifier 307 the output of which is clamped by back to back Zener diodes 308 and 309 feeding back to the inverting input of the amplifier 307. When a seek operation is initiated, the position error $E_o$ becomes very large initially. The large $E_o$ produces a current which overrides the reference current outputted from the switch 300 and resistor 301'. The output of the amplifier 306 reverses in sign (toggles) so as to output a voltage with an appropriate sign for acceleration. When the actual velocity approaches the scheduled velocity, the position error approaches zero. The current produced at 303 by the components of the position error signal is no longer sufficient to override the reference current produced by switch 300 and resistor 301' and the output of toggling amplifier 304 switches, outputting a voltage with a sign suitable for deceleration. Positive feedback to amplifier 307 also changes the level at which the position error can cause the switch 304 to toggle, thus preventing retoggling by large position errors during deceleration. The output from the toggling amplifier 304 is passed to yet another switch 306 (FET type IH 5011) to pass an initial reference voltage during acceleration and deceleraton modes of the seek and to prevent the passage of a reference voltage during a coasting portion of the seek operation or during a track following operation. This is accomplished by NAND logic gates 316 and 318. The first NAND gate 316 receives as one of its inputs, an output from the override circuit 64, which is high when the position error is within satisfactory magnitude limits and low when the error exceeds those limits. It also receives the maximum velocity ("MAX VEL") control signal outputted as the most significant bit of the eight-bit function generated by the function generator 292. This signal is high during the maximum velocity period (i.e. coast segment) of the seek operation, and low otherwise. The second NAND gate 318 accepts the output of the first NAND gate 316 and the least significant bit outputted directly by the function generator 292. This bit signal is high during a seek mode and low during a track following mode. After inversion by the inverter 320 and 322, this signal is referred to as the ON TRACK signal and is passed to the I/O controller 32 on line 35 to indicate that track following operations (i.e. read or write) may be commenced, and to the dual gain amplifier 43 on line 85 for controlling the gain of the position error signal $E_o$ passed by that circuit. The output of the switch 306 is combined with the output of a time constant circuit 312 at the point 311 and fed to the negative input of an operational amplifier 314. The variable resistor 312a, resistors 312b, 312c, and 312d and the capacitor 312e of the time constant circuit 312 provide an output adjusting the initial reference voltage passing from the switch 306 to account for motor inductance. The amplifier 314 outputs the modified reference voltage on line 291 to the multiplying input of the digital to analog convertor 294.

Another operation which must necessarily be performed during the seek operation is the updating of the servo reference position x. This is accomplished through the position error signal $E_o$ outputted by the DRC 42, the sign change ($\pm 1$) circuit 58, the voltage controlled oscillator circuit 60, motor adaptor circuit 62, rate multiplier 54 and override circuit 64.

Sign Change Circuit

Figure 9:
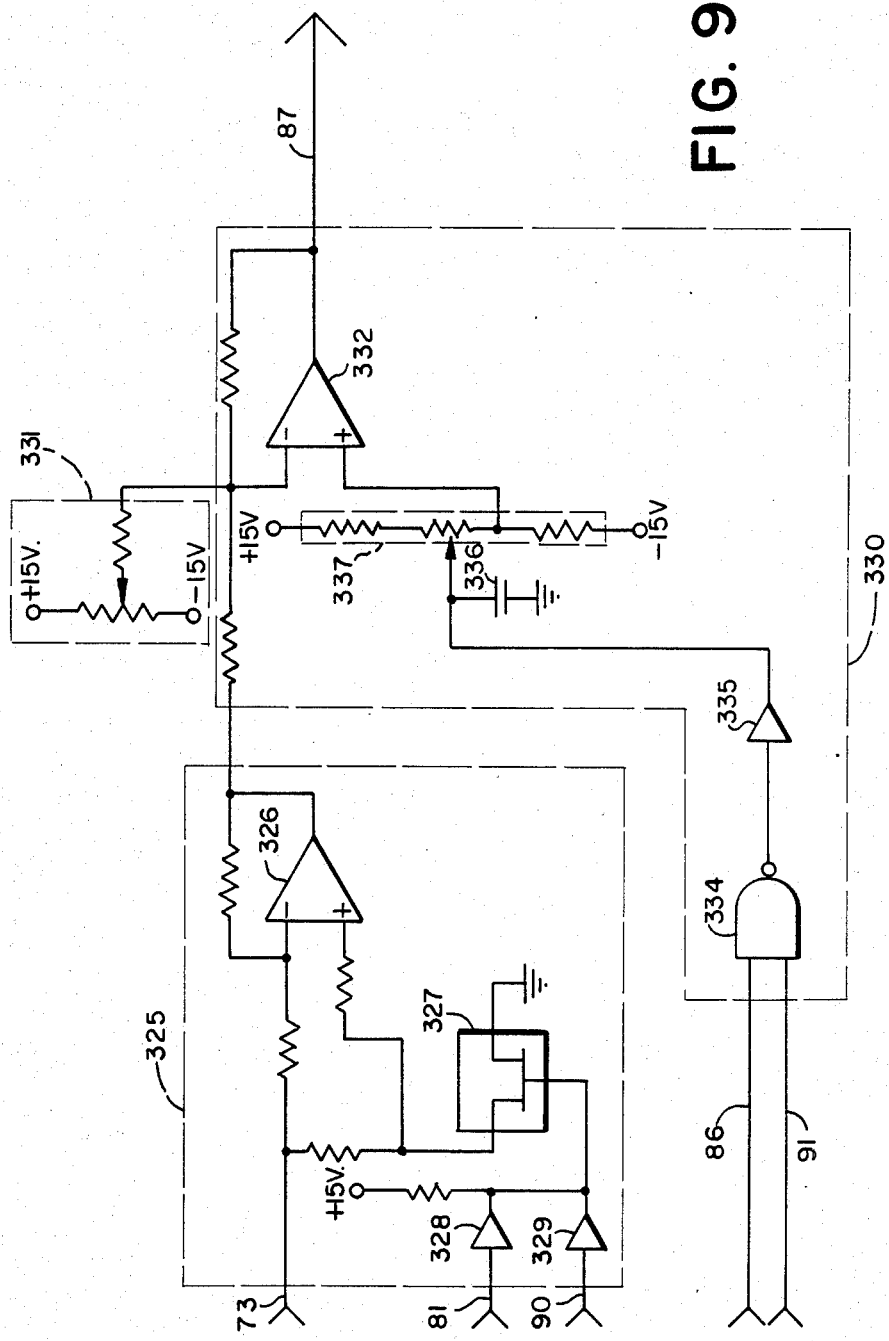
FIG. 9 depicts schematically the sign change ("±1") circuit of the control system.

The function of the sign change circuit 58 is to multiply the position error signal $E_o$ by an appropriate sign (i.e. $\pm 1$) in order that the magnitude of the position error be passed to the voltage control oscillator with the proper sign. In addition, the sign change circuit 58 prevents the servo system from overshooting its desired profile when switching from acceleration to deceleration. The components of the sign change circuit 58 are depicted in FIG. 9. Sign change is accomplished by means of subcircuit 325 including an operational amplifier 326 (type 347) and a transistor switch 327 (type IH5011). The switch 327 is controlled by a pair of buffer gates 328 and 329 which together act as an equivalent AND gate. The SIGN signal generated by the summer circuit 50 is passed on line 81 through the first buffer 328. Another signal is passed from one of a pair of analog comparators in the override circuit 64 along the line 90 to the second buffer 329. The level of this latter signal is high except when the position error $E_o$ exceeds the positive override limit. The position error $E_o$ outputted by the DRC 42 is passed via the line 73 to the subcircuit 325. The sign of the position error $E_o$ will indicate overshoot or undershoot (i.e. lead or lag) of the actual position y by the reference position x, depending upon the direction in which the carriage 27 is being moved. As the voltage controlled oscillator 60 responds to a positive voltage input by increasing the frequency of its output signal and a negative voltage input by decreasing the frequency of its output signal, it is necessary to control both the magnitude and the sign of the positional error signal sent to that circuit. When the switch 327 is open, the amplifier 326 becomes a unity gain following amplifier and the positional error is passed unchanged in sign. If the transistor switch 327 is closed, then the position error signal $E_o$ is not passed to the positive input of amplifier 326 and feedback makes it an inverting unity gain amplifier reversing the sign of the position error signal.

An anticipate subcircuit 330 is formed by operational amplifier circuit 332, a logic (NAND) gate 334, capacitor 336 and resistor network 337. Inputs to the NAND gate 334 are an inverted maximum velocity signal (MAX VEL) outputted by inverting gate 293 of the seek drive circuit 56 (see FIG. 8) and an output from the override circuit on line 91 which is high when the servo system is in the override condition (i.e. during initial carriage 27 acceleration). During initial acceleration before maximum velocity is reached, the servo is in the override condition and the output of the NAND gate 334 is low. This clamps the capacitor 336 to zero causing the resistor network 337 to output some voltage lower than a nominal voltage. As the carriage 27 approaches nominal velocity, the override condition disappears and the output of the NAND gate 334 goes high causing the voltage outputted by the resistor network 337 to rise, thereby increasing the voltage level outputted by the amplifier 332 to the VCO 60. The effect is to lower the anticipated deceleration curve during acceleration, beginning deceleration earlier so as not to overshoot the nominal deceleration curve. For long seeks this is not a problem so the anticipate function is locked out by a low level signal on line 86. Gate 335 (type LS 14) buffers the NAND gate 334 output. Resistor network 331 is provided to suitably bias the nominal voltage outputted by the second amplifier 332.

Voltage Controlled Oscillator ("VCO")

Figure 10:
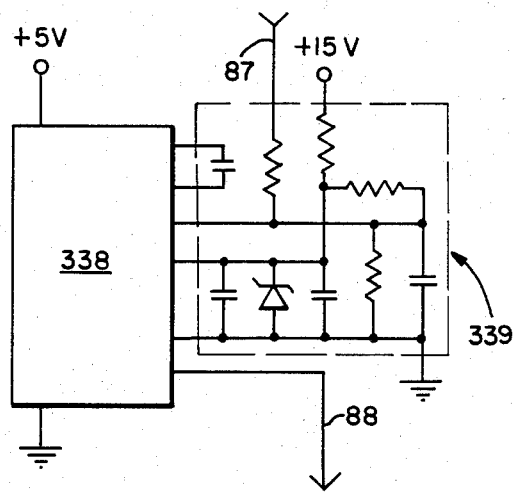
FIG. 10 depicts schematically a voltage controlled oscillator circuit of the control system.

Output from the second amplifier 332 is passed on line 87 to the voltage controlled oscillator circuit 60 depicted in FIG. 10. The VCO is of a conventional design and comprises a type LS 325 oscillator 338 and associated circuit elements indicated generally by the notation 339. The network 339 and the output of the anticipate circuit 330 of FIG. 9 effect the bias of the oscillator 338. The oscillator 338 outputs on line 88 a pulsed (high level/low level) signal the frequency of which is controlled by the voltage from the second amplifier 332 and is of a nominal value when that voltage is zero.

Motor Adaptive Circuit

The output of the voltage controlled oscillator 60 is carried to the motor adaptive circuit 62. In the depicted servo system, the scaling of the velocity profile for deceleration of the carriage 27 is governed, in part, by the voltage controlled oscillator 60 which drives the rate multiplier 54. By adjusting the frequency output of the VCO 60, the servo can be adapted to accommodate a wide range of motor and drive amplifier constants. The purpose of the motor adaptive circuit is to make the servo control system self-adapting by measuring the acceleration performance of the power amplifier 39/voice control motor 28 combination during the acceleration portion of a seek and adjusting the servo control during deceleration by appropriate scaling. The motor adaptive circuit 62 is not limited to the preferred embodiment being described or to position control servos generally, but is believed adaptable to any servo system using a changing frequency signal, such as can be outputted by a voltage controlled oscillator. It may also be modified for use with a system employing a signal with another variable characteristic (e.g. amplitude) for feedback control.

Figure 11:
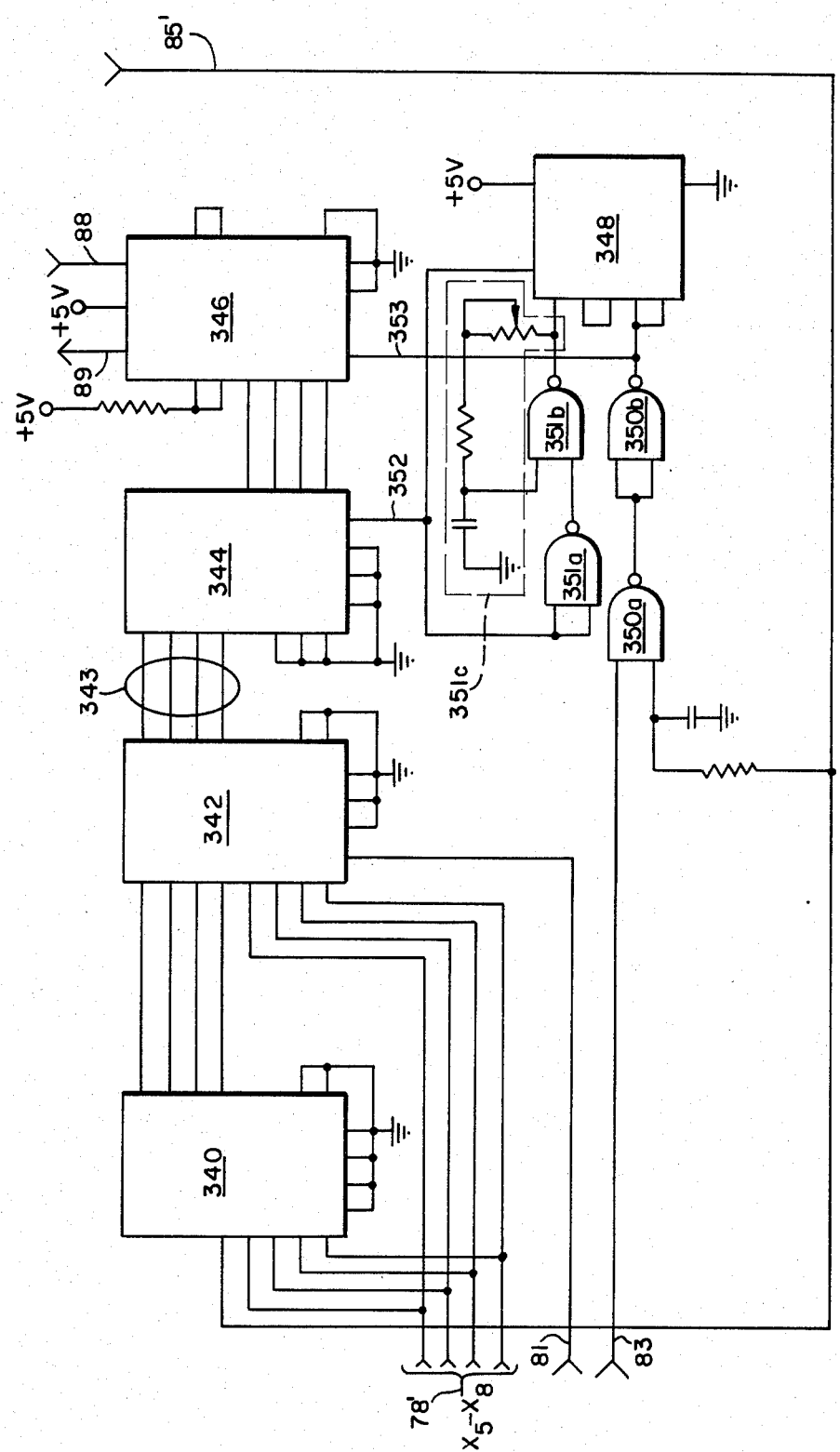
FIG. 11 depicts schematically a motor adaptive circuit of the control system.

The major elements of the motor adaptive circuit 62 are depicted in FIG. 11 and include a first latch 340, a function generator 342, a second latch 344, a rate multiplier 346 and a counter 348. Four bits of the reference position x (i.e. $x_5-x_8$) are fed to the first latch 340. Operation of the latch 340 is controlled by the ON TRACK signal passed from the seek drive circuit 56 on line 85. When the servo control system finishes a seek operation, the ON TRACK signal changes to a high level and the latch stores the on track values (i.e. the four identified bits of the reference position x). The four bits stored in the latch 340, as well as current values of those same four bits of the reference position x are carried to the function generator 342 which is another read only memory (EPROM type 2716) which continuously compares the latched values with the present indicated values. Based upon the difference between the two sets of values, the generator 342 repeatedly provides a four-bit digital function to the second latch 344 along lines 343. This function is initially high during the beginning of acceleration but drops as the acceleration period progresses and the carriage 27 begins to move. The function programmed into the function generator 342 is determined for a fixed period of acceleration. That period should be less than the maximum acceleration (about 8 milliseconds in the embodiment being described) and should correspond to the time needed to travel the distance of the selected reference position bits (i.e. $x_5-x_8$) being compared (about 5 milliseconds in this embodiment). The output of the voltage controlled oscillator 60 is not affected unless the acceleration period is at least as long as the predetermined period upon which the functions in the function generator 342 are based (i.e. 5 milliseconds). The second latch 344 is set by an appropriate signal generated to coincide with the end of the predetermined acceleration period upon which the function is based.

In the depicted embodiment this signal is generated by the counter 348 and associated NAND gates 350a, 350b, 351a and 351b. The logic elements 350a and 350b activate the counter 348 at the beginning of the seek operation if the most significant bit of f(w+x) goes high. The serial NAND gates 350a and 350b act as an equivalent AND gate. The inputs to the first NAND gate 350a are the ON TRACK signal on line 85 from the seek drive circuit 56 and the inverse of the most significant bit outputted by the function generator 243 of the schedular circuit 52 on line 83. The signal reaching NAND gate 350a on line 83 goes high only when the first generator 242 indicates that the seek operation will require at least five milliseconds time. The ON TRACK signal on line 85 goes low when the new seek is initiated. This is delayed to gate 350a by the RC time constant. Thus the output of gate 350a momentarily goes low when a sufficiently long seek is initiated. The output of NAND gate 350b will pulse high when the seek operation is to require at least 5 milliseconds duration. This resets counter 348 to count during acceleration. A suitable clock source is provided in the present embodiment by an oscillator made up of NAND gates 351a and 351b and associated circuit elements, indicated generally as 351c. After being counted down, the output signal of the counter 348 passed to the latch 344 on line 352 sets the latch 344, storing the last function passed to it by the function generator 342. The function outputted by the generator 342 is related to the actual distance travelled by the carriage 27 during the predetermined acceleration period. It is directly proportional to acceleration. The function is used to scale the deceleration of the carriage 27 by programming the rate multiplier 346 which divides down the frequency of the signal outputted by the VCO 60 before it is passed to the velocity programming rate multiplier circuit 54. If the acceleration period of a seek operation is not as long as the predetermined acceleration period on which the motor adaptor circuit 62 is based, the second latch 344 is not set and the rate multiplier 346 uses the last stored value to adjust the VCO output. Without a motor adaptive circuit 62, the voltage controlled oscillator 60 is set typically for the slowest or nominal motor carriage configuration. With the motor adaptive circuit 62, the VCO is selected for a better than the best (i.e. the fastest) possible motor/carriage combination and the VCO output reduced by the rate multiplier 346. This prevents overflow of the latch 342. A reduction of up to 50% carriage acceleration will be automatically accommodated by the circuit.

The relationship between the VCO signal passed into the motor adaptor circuit 62 on the line 88 and the output of the motor adaptor circuit on the line 89 is given by the following equation:

$$f_{mca} = f_{vco}(M/N)$$

where N is the constant for the rate multiplier 346, M is provided by the function generator 342, $f_{vco}$ is the signal outputted by VCO circuit 60 on line 88 and $f_{mca}$ is the signal outputted on line 89 after acceleration. The SIGN signal generated by the summer circuit 50 is passed on line 81 to the function generator 342 to indicate the direction of travel of carriage 27 and which of the two values, initial reference position stored in the latch 340 or current reference position passed directly to the generator 342, is to be subtracted from the other. The generator 342 is concerned only with the absolute magnitude of the distance travelled.

Rate Multiplier

Figure 12:
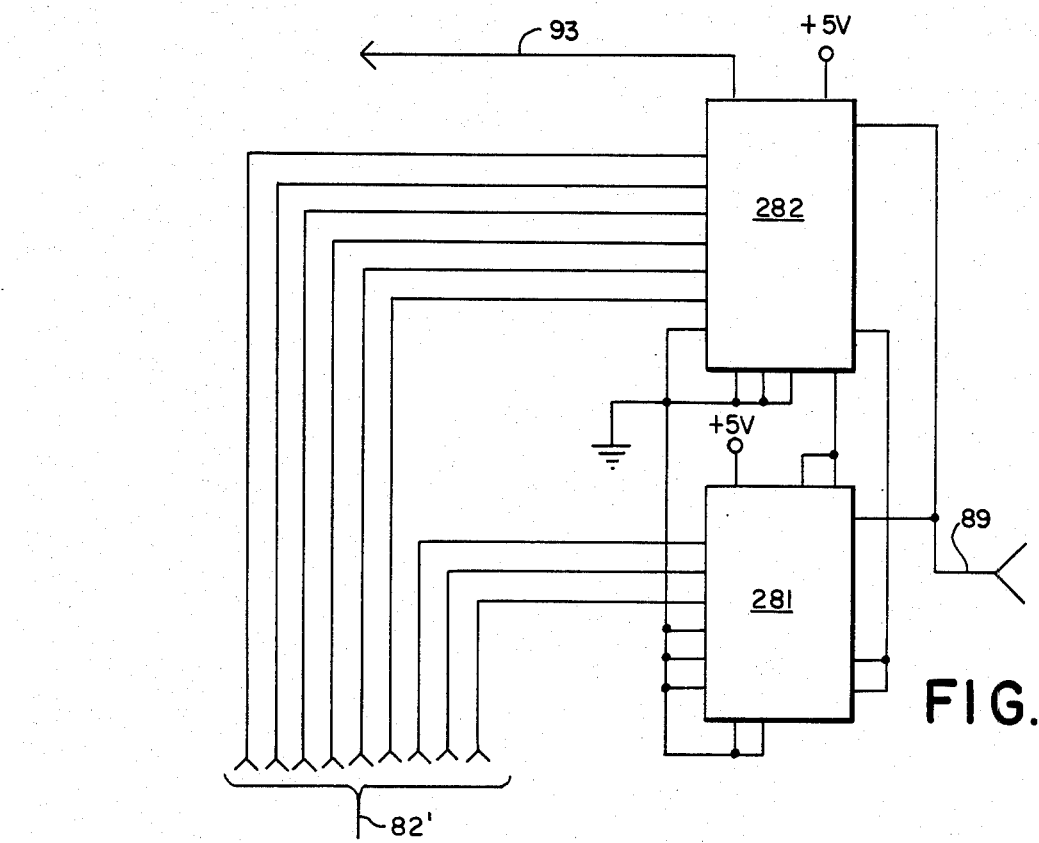
FIG. 12 depicts schematically a rate multiplier circuit of the control system.

The rate multiplier circuit 54 of the preferred embodiment is depicted in FIG. 12 and comprises, as the name implies, a rate multiplier formed in the depicted embodiment by first and second 6-bit (type 7497) rate multipliers 281 and 282. The first multiplier 281 accepts the three least significant bits of the velocity profile signal f(w+x), i.e., the two least significant bits outputted by the latch 246 and the output of the one bit latch 248 of the scheduler 52. The second multiplier 282 accepts the six most significant bits of the velocity profile function passed from the latch 246. The two multipliers 281 and 282 are ganged for simultaneous action as a single multiplier. A clock pulse signal outputted by the motor adaptive circuit 62 on the line 89 (or VCO if motor adaptor circuit is not provided) is fed to the clock inputs of the multipliers 281 and 282. The frequency of the signal outputted on the line 89 by the motor adaptive circuit 62 is a function of both the position error signal $E_o$ and the actual performance of the servo system. The second multiplier 282 outputs a pulsed signal on line 93 carried to the reference position indicator 160 of the DRC 42. The rate multiplier signal is used to increment bit-by-bit the ganged, up/down counters 181–184 of the reference position indicator 160. In this way, during the seek operation, the reference position x is driven to follow the actual servo position y for acceleration and to program the servo position (or velocity) for deceleration.

Override Circuit

Figure 13:
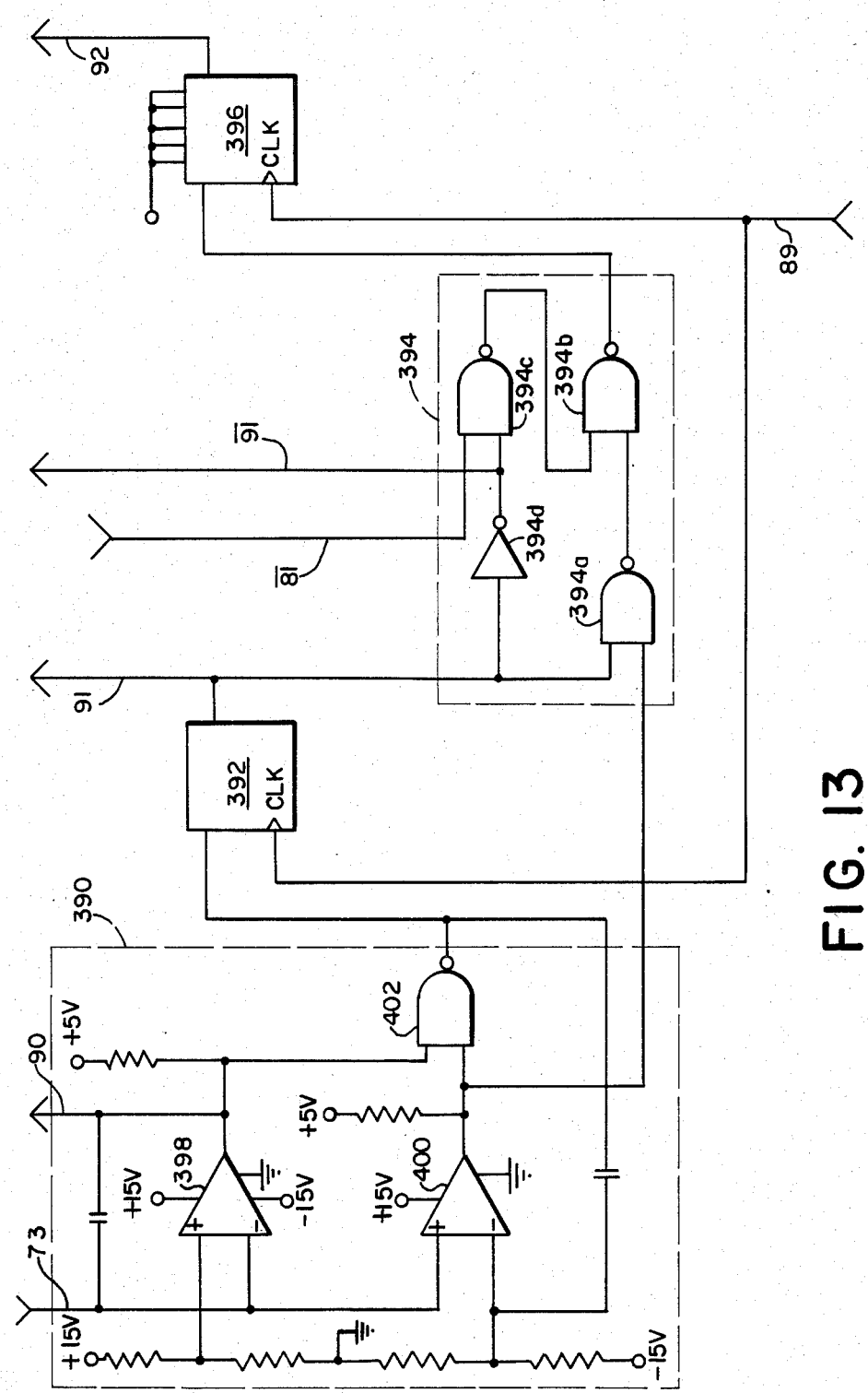
FIG. 13 depicts schematically an override circuit of the control system.

The override circuit 64 monitors the position error $E_o$ and outputs appropriate control signals when that error becomes exceedingly large. The override circuit 64 is depicted in detail in FIG. 13 and comprises a comparator subcircuit 390, a first latch 392, a counter control logic circuit 394, and a second latch 396. The purpose of the comparator 390 is to constantly monitor the magnitude of the position error signal $E_o$ on line 73 against predetermined limits. An analog comparator circuit 390 is provided and comprises a pair of voltage comparators 398 and 400 and a NAND logic gate 402. The output of both comparators 398 and 400 is high when the position error $E_o$ is within acceptable limits. Depending upon the sign of the position error, $E_o$, one of the comparators 398 or 400 will go low if the magnitude of the position error signal exceeds a predetermined value. The output of the first comparator 398 monitoring maximum (positive) position error is carried as a control signal to the sign change circuit 58 along the line 90. The outputs of both comparators 398 and 400 are fed to the inputs of the NAND gate 402 the output of which is passed to the first latch 392. The output of the NAND gate 402 is low when the position error is within bounds and high when it exceeds a positive or negative limit. The output of the NAND gate 402 is passed through latch 392 to counter control logic circuit 394 and along line 91 to logic in the sign change circuit 58 and latch 246 in the schedular circuit 52 previously described. An inverted signal is passed from the inverter 394d to the seek drive circuit on channel 91. Output of the override circuit 64 is synchronized by clocking the latch 392 using the output of the motor adaptive circuit 62 passed along the line 89 (or output of the VCO 60 or line 88 if a motor adaptive circuit is not supplied).

The counter control logic 394 outputs a signal used to control the operation of the reference position indicator 160 in the DRC 42. In the embodiment depicted, the cascaded counters 181–184 forming the reference position indicator 160 are incremented by means of a clock signal outputted by the rate multiplier 54 along the line 83. The direction in which the counters 181–183 of the reference position indicator 160 are incremented is controlled by the level of the signal outputted by the counter control logic circuit 394 and latch 396. When the position error $E_o$ is within predetermined tolerances, the level of the signal passed from the latch 396 on the line 92 is now at an appropriate level to increment the counters 181–185 in the reference position indicator 160 in the direction in which the servo head 26 is to be moving as indicated by the sign bit produced by the summer circuit 50 and outputted on line 81. When the magnitude of the position error $E_o$ exceeds the predetermined limits embodied in the comparator circuit 390, the level of the signal outputted by the counter control logic 394 and latch 396 is reversed causing the counter to increment in the opposite direction.

While a preferred embodiment of the invention has been described, other embodiments are possible and may be preferred to balance diminished performance capability with diminished costs. For example, the motor adaptive circuit may be dispensed with if variation in the motor parameters is small. In such case, the control system would be modeled to the performance of a worst case positioning system whereas the preferred embodiment is modeled to a best case (i.e. fastest response) positionig system. As was previously indicated, a microprocessor could be incorporated to perform the function of the summer and schedular circuits and perhaps the functions of some of the other circuits of the control system (i.e. the DRC). It is believed, however, that inexpensive microprocessors commercially available at the present time will not provide the response time provided by the described preferred embodiment. If desired, the feedforward seek drive circuit may be eliminated and the servo head control can be provided during seek operations by means of a variable gain amplifier. The amplifier would output a signal proportional to the position error signal $E_o$, the gain of which would be controlled by the magnitude of velocity profile signal $f(w+x)$. In each of these other embodiments, servo control is still accomplished by means of the position error signal $E_o$. This avoids the necessity of differentiating that signal to provide control during a seek operation. Moreover, while the present invention has been described with respect to controlling the positioning of ganged transducers for a magnetic data storage apparatus, one skilled in the art will appreciate that the invention could be applied to other data storage forms such as elongated webs and drums, thus, the invention is not necessarily limited to controlling a strictly linear motion but may be used to control motion along a single path. Moreover, the invention may be used with other types of storage devices, particularly optical data storage disks, and may find application outside the data storage field.

What is claimed is:

1. In a positioning system for moving a movable member along a defined path of movement from an initial position to a final position and including the movable member having the defined path of movement, means for dividing the path of movement into a series of contiguous segments, actuator means coupled to the movable member for moving said movable member, a control system comprising:

reference position means for storing a reference position of the movable member with respect to the path of movement, the stored reference position being variable, indicating an approximate position of the movable member with respect to the segments along the path of movement including an approximate incremental position with respect to a segment and initially indicating said initial position;

position means for generating an indication of actual incremental position of the movable member with respect to a segment;

controller means responsive to said position means and to said reference position means for generating a position error value having a magnitude indicating a difference between said approximate incremental position and said actual incremental position;

means for controlling said actuator means in response to said position error value; and updating means responsive to a command indicating a final position of the member for incrementing the stored reference position from said initial position to said final position.

2. The positioning system of claim 1 wherein said updating means comprises:
    means for generating a scaling function having a magnitude diminishing as the stored reference position approaches the final position; and
    incrementing means for incrementing the stored reference position towards said final position at an incrementation rate related to the magnitude of said scaling function.

3. The positioning system of claim 2 wherein said updating means further comprises:
    feedback means for varying the incrementation rate of the incrementing means in response to said position error value.

4. The positioning system of claim 3 wherein the updating means further comprises:
    override means for continuously comparing the magnitude of the position error value with a predetermined magnitude and for controlling the direction of incrementation of said reference position towards or away from the final position.

5. The positioning system of claim 4 wherein said actuator means is electromagnetic and has a load acceleration/deceleration response related to an electric current supplied thereto for accelerating and decelerating the movable member and said control system further comprises:
    feedforward means responsive to said scaling function for generating a feedforward control value having a magnitude corresponding to a magnitude profile for an actuator electric current modeled to move the movable member to said final position using a model electromechanical actuator; and
said means responsive to said position error value is further responsive to said feedforward control signal and comprises:
    means for combining said position error value and said feedforward control value to generate a composite actuator signal to control said actuator means.

6. The positioning system of claim 5 wherein said feedback means comprises:
    means for generating an error signal having at least one measurable characteristic varied in response to the magnitude of the position error value; and
    wherein the incrementing means varies the incrementation rate in response to the varied characteristic of the error signal.

7. The positioning means of claim 6 wherein said feedback means further comprises:
    means for measuring a variable of the movable member movement to indicate actual performance of the positioning system;
    means for comparing the measured variable with a predetermined variable for a comparable movement by a model positioning system; and
    means for varying said measurable characteristic of the error signal in response to the comparison.

8. The positioning system of claim 7 further characterized by said control system holding said movable member at said final position after movement by maintaining said reference position equal to said final position.

9. The positioning system of claim 1 wherein said means for dividing comprises:
    a record medium along the defined path of movement; and
    servor data recorded on the record medium in a manner to permit said servo data to be sensed independently of any other detectable information on the record medium, said servo data defining said plurality of segments and further indicating incremental position with respect to a segment;
wherein said positioning system further comprises:
    servo transducer means coupled to said movable member for detecting the servo data recorded on the record medium;
wherein said control system further comprises:
    means responsive to the servo transducer means for generating a pair of position signals having values together indicating unambiguously said actual incremental position; and
wherein said controller means is continuously responsive to the two position signals and said position error value is at all times dependent upon the values of both of the two position signals.

10. The positioning system of claim 9 wherein said position error value is indicated by a position error signal and said controller means comprises:
    first memory means for generating a reference position signal having a value related to said approximate incremental position; and
    controller means for combining at least one of said position signals with said reference position signal to form a first component of said position error signal.

11. The positioning system of claim 10 wherein said pair of position signals are phase related to said actual incremental position and said reference position signal is phase related to said approximate incremental position and said controller means for combining comprises:
    first means for multiplying said reference position signal and said one position signal.

12. The positioning system of claim 11 wherein said controller means further comprises:
    second memory means for generating a second reference position signal phase related to said approximate incremental position;
    second means for multiplying said second reference position signal and the remaining position signal to form a second component of said position error signal; and
    means for combining said first component and said second component.

13. The positioning system of claim 3 wherein said feedback means comprises:
    sign change means for controlling the polarity of said position error signal in relation to relative proximity of the approximate incremental position and of the actual incremental position to the final position; and
    voltage controlled oscillator means for generating an error signal having a frequency varying about a nominal frequency level in response to the polarity controlled position error signal from said sign change means.

14. The positioning system of claim 13 wherein said updating means comprises:
    rate multiplier means for generating a cyclic signal having a cycling rate related to the magnitude of said scaling function and the frequency of said error signal.

15. The positioning system of claim 14 wherein said means for generating a scaling function comprises:

means for generating a distance signal having a value indicating distance between stored reference position and said final position; and memory means for generating said scaling function in response to said distance signal.

16. In a positioning system for moving a movable member along a defined path of movement and including means for dividing the path of movement into a series of contiguous segments and actuator means coupled to the movable member for positioning of the member, a method of controlling the movement of the movable member from an initial position to a final position comprising the steps:

generating an indication of actual incremental position of the movable member with respect to a segment;

storing a reference position of the movable member, the stored reference position being variable, indicating an approximate position of the movable member with respect to the segments including an approximate incremental position with respect to a segment and initially indicating said initial position;

generating a position error value indicating a difference between said actual incremental position and said approximate incremental position;

incrementing in response to a command indicating said final position the stored reference position from said initial position toward said final position; and actuating said actuator means in response to said position error value.

17. The method of claim 16 wherein said incrementing step is repeated until said reference position is incremented to said final position.

18. The method of claim 17 further comprising the steps of:

generating a scaling function having a magnitude diminishing as said reference position is incremented to said final position; and controlling the repetition rate of said incrementing step in response to the magnitude of said scaling function.

19. The method of claim 18 wherein said controlling step includes controlling said repetition rate in response to said position error value.

20. The method of claim 19 further comprising the steps of:

comparing the magnitude of the position error value with a predetermined value; and controlling the direction of incrementation of the reference position in response to the comparing step.

21. The method of claim 20 further comprising the steps of:

generating in response to said scaling function a feedforward control value for having a magnitude corresponding to a magnitude for an actuator control signal modeled to move the movable member to said final position using a model actuator means; and combining said feedforward control value and said position error value to generate a composite actuator control value; and wherein said actuating step includes actuating said actuator in response to said composite control value.

22. The method of claim 21 wherein said controlling step further comprises the steps of:

measuring a variable of the movement of the movable member;

comparing said measured variable with a predicted variable value for a comparable movement of the member by a model positioning system; and varying the repetition rate of said incrementing step in further responsive said comparing step.

23. The method of claim 22 wherein said controlling step includes the steps of:

generating an error signal having at least one measurable characteristic varying about a nominal value in response to the magnitude of said position error value;

varying the characteristic of the error signal in response to the comparing step; and incrementing the reference position in response to the varied error signal.

24. The method of claim 19 wherein said controlling step comprises the step of:

converting said position error value into a velocity error signal; and varying the repetition rate in response to said velocity error signal.

25. The method of claim 24 wherein said controlling step further comprises the step of:

measuring the movement of the movable member for a predetermined period of time;

comparing the measured movement with a predetermined movement value representing a similar movement by a model positioning over said predetermined period of time; and varying the velocity error signal in response to said comparing step before controlling the repetition rate.

26. The method of claim 25 wherein said velocity error signal has a varying frequency indicating velocity error and said step of varying the repetition rate comprises:

scaling the frequency of the velocity error signal in proportion to the magnitude of the scaling function; and incrementing the reference position with the scaled velocity error signal.

27. The method of claim 16 wherein said means for dividing includes a record medium along the path of movement and servo information recorded on the record medium in a manner to permit the servor information to be sensed independently of any other information recorded on the record medium, the recorded servo information defining said series of segments and indicating incremental position within a segment; wherein said system further includes transducer means coupled to the movable member for detecting said servo information; wherein said step of generating an indication of actual incremental position comprises the step of:

generating a pair of position signals having values together indicating unambiguously an actual incremental position of the movable member with respect to a segment; and wherein the step of generating a position error value further includes generating a position error value dependent at all times upon the values of both of the two position signals.

28. The method of claim 27 wherein said step of generating a position error value comprises the steps of:

generating a first reference position signal in response to said reference position; and combining said first reference position signal and one of the two position signals.

29. The method of claim 28 wherein said pair of position signals are phase related to said actual incremental position, said reference position signal is phase related to said approximate incremental reference position and said step of combining comprises:
multiplying the first reference position signal and the one position signal to form a component signal.

30. The method of claim 29 further comprising the steps of:
generating a second reference position signal phase related to said approximate incremental position;
multiplying said second reference position signal and the remaining position signal to form a second component signal; and
combining the two component signals.

31. A data storage system comprising:
a data disk mounted for rotation;
a transducer for detecting data recorded on said disk during rotation;
a carriage mounting said transducer for movement radially with respect to the disk;
a motor coupled to said carriage for moving said carriage radially with respect to said disk;
servo data recorded on the disk and defining a plurality of contiguous servo bands when the disk is rotated and indicative of position within the servo bands, the transducer being capable of detecting the servo data recorded thereon;
position detection means coupled to the output of the transducer for generating a first transducer position signal and a second transducer position signal having a fixed phase displacement with respect to the first transducer position signal, the two transducer position signals being phase related to an actual incremental position of the servo transducer with respect to an opposing servo band;
reference position means for storing a digital reference position representing an approximate position of the servo transducer with respect to the servo bands including an approximate incremental position with respect to one band;
controller means responsive to said two transducer position signals and to the stored digital reference position for generating a position error signal indicating a difference between the incremental position indicated by the two transducer position signals and an incremental position indicated by the digital reference position signal, the magnitude of the position error signal being dependant at all time upon the magnitude of both of said two transducer postion signals; and
means responsive to said position error signal for supplying a current to the motor for positioning said carriage.

32. The data storage system of claim 31 wherein said controller means comprises:
first digital memory means responsive to said reference position means for converting said stored reference position into a first reference position signal phase related to said approximate incremental position; and
multiplier means for multiplying said first reference position signal by one of said transducer position signals to generate a first component signal of the position error signal.

33. The data storage system of claim 32 wherein said controller means further comprises:
second memory means responsive to said reference position means for generating a second reference position signal phase related to said approximate incremental position and having a fixed phase displacement with respect to the first reference position signal;
second multiplier means for multiplying the second reference position signal and the remaining transducer position signal to generate a second component signal; and
summing means for adding said first component signal and said second component signal to generate said position error signal.

34. The data storage system of claim 31 further comprising:
updating means responsive to a carriage position command for incrementing the stored reference position to a commanded position.

35. The data storage system of claim 31 wherein the updating means comprises:
means responsive to said stored reference position and a command signal indicating a commanded position for generating a velocity profile function having a magnitude substantially proportional to a magnitude of a modeled velocity of the carriage when located at a distance from a movement final position equal to the distance between the reference position and commanded position; and
means for incrementing the stored digital reference position at rate related to the magnitude of the velocity profile function.

36. The data storage system of claim 35 wherein said updating means further comprises:
first means for controlling the direction of incrementation of the stored reference position towards or away from said commanded position.

37. The data storage system of claim 36 wherein said position error signal is oscillatory in form and has a voltage magnitude of zero for zero position error and said means for controlling comprises:
first means for comparing the absolute magnitude of said position error signal a predetermined magnitude and
means for incrementing the stored reference position away from the commanded position when said absolute position error magnitude exceeds said predetermined magnitude.

38. The data storage system of claim 37 wherein said updating means further comprises:
means for controlling the polarity of the position error signal to indicate phase lead or lag between the reference position and the actual incremental position with respect to the commanded position;
a voltage controlled oscillator generating a cyclic signal having a cycling frequency varying about a nominal frequency in response to the polarity controlled position error signal; and
wherein said means for incrementing, increments the stored reference position at a rate related to both the frequency of the cyclic signal and the magnitude of the velocity profile function.

39. The data storage system of claim 38 wherein said updating means further comprises:
means for measuring distance moved by the carriage during a predetermined time interval of an acceleration portion of a carriage movement;

means for comparing the measured distance with a predetermined distance value for a model positioning system accelerating a movable member for the same predetermined time interval; and rate multiplying means between said voltage controlled oscillator and said means for incrementing for further varying the frequency of said cyclic signal in response to said means for comparing.

40. The data storage system of claim 38 wherein said updating means further comprises:

second means for storing an initial reference position value stored by the reference position means at the beginning of a carriage movement;

digital memory means responsive to the second means for storing and the reference position means for generating a ratio value of a difference between a current reference position indicated by the reference position and the initial reference position value and a predetermined value for a maximum possible distance moved in a predetermined time interval by a model motor-carriage combination having a maximum modeled acceleration;

times means for signaling said predetermined time interval;

storage means responsive to said timing means and said digital memory means for storing the ratio value existing at the end of said predetermined time interval; and rate multiplying means between said voltage controlled oscillator and said means for incrementing for reducing the frequency of said cyclic signal in proportion to said ratio.

41. The data storage system of claim 35 wherein said means is responsive to said stored reference position and a command signal comprises:

distance means responsive to said stored reference position for generating a distance signal having a value indicating distance between the stored reference position and a commanded position and digital memory means responsive to said distance signal for generating said velocity profile function.

42. The data storage system of claim 35 further comprising:

memory means for generating a feedforward scaling function in response to said velocity profile signal;

switching means responsive to said components of the position error signal for generating a reference voltage signal changing in polarity when said components of the position error signal become sufficiently small in magnitude; and means for generating a feedforward control signal having a magnitude related to a magnitude of said feedforward control function and the polarity of said polarity signal.

43. The data storage system of claim 42 wherein said means for supplying a current to the motor further comprises:

means for reducing gain of the position error signal during movement of the carriage to the commanded position;

means for combining the gain controlled position error signal and the feedforward control signal to generate a composite control signal; and current means for supplying a current to the motor having a magnitude proportional to the magnitude of the composite control signal.

44. In a data storage system incluuding a data disk mounted for rotation, a transducer for reading data recorded on said disks, a carriage mounting said transducer for movement in a radial direction with respect to the disk, a motor coupled to the carriage for moving the carriage radially with respect to the disk, the disk having recorded thereon servo signals for providing when the disk is rotated a plurality of contiguous, concentric servo bands and indicative of position within the servo bands, the transducer being positioned opposite the data disk for detecting the servo signals recorded thereon, a method of controlling the positioning of the carriage and transducer with respect to the disks comprising the steps of:

detecting the recorded servo signals;

generating a first oscillatory position signal and a second oscillatory position signal having the same form as the first oscillatory position signal and a fixed phase difference from the first oscillatory phase signal in response to said detecting step, the two oscillatory position signals indicating unambiguously actual incremental position of the servo transducer with respect to an opposing servo band;

storing a variable reference position of the transducer;

generating a reference position signal having a magnitude related to the stored reference position and indicating an approximate position of the servo transducer with respect to the servo bands;

generating a position error signal in response to said reference position signal, the first oscillatory position signal and the second oscillatory position signal, the position error signal having a magnitude dependent at all times upon the magnitudes of both the first oscillatory position signal and the second oscillatory position signal; and actuating said motor in response to said position error signal.

45. The method of claim 44 further comprising the step of:

incrementing the stored reference position signal to cause movement of the carriage and transducer from an initial position with respect to the servo bands to a commanded position with respect to the servo bands.

46. The method of claim 45 wherein said varying step comprises the steps of:

generating a velocity profile function having a magnitude related to a magnitude of a modeled velocity of the carriage when located at a distance from a movement final position equal to the distance between the reference position and the commanded position; and incrementing the stored reference position at a rate related to the magnitude of the velocity profile function.

47. The method of claim 46 wherein said method further comprises the step of:

generating a cyclic signal having a cycling frequency varying about a nominal frequency in response to the magnitude of the position error signal; and said incrementing step further includes incrementing the stored reference position at a rate also related to the frequency of the cyclic signal.

48. The method of claim 47 wherein said method further comprises the steps of:

comparing the absolute magnitude of the position error signal to a predetermined value; and controlling the direction of incrementation of the stored reference position in response to said comparing step.

49. The method of claim 48 wherein said step of generating a position error signal comprises the steps of:
generating from said reference position signal a pair of secondary reference position signals having oscillatory forms like the forms of the two oscillatory position signals and a fixed phase difference for indicating unambiguously an approximate incremental position with respect to a band; and
combining the two oscillatory position signals and the two secondary reference position signals to generate said position error signal.

50. The method of claim 49 wherein said method further comprises the steps of:
measuring change in the reference position signal value occurring over a predetermined period of time;
comparing the change to a predetermined value for a model positioning system including a model motor; and
varying the frequency of the cyclic signal in response to the comparing step before said incrementing step.

51. The method of claim 50 wherein the motor has a load-acceleration/deceleration response related to the magnitude of an electric current supplied thereto and said method further comprises the steps of:
generating a feedforward scaling function in response to said velocity profile function;
generating a feedforward control signal having a magnitude related to the magnitude of said feedforward scaling function; and
said actuating step further comprises the steps of:
reducing gain of said position error signal during carriage movement to the commanded position;
combining said gain controlled position error signal and said feedforward control signal to generate a composite control signal; and
actuating said motor in response to said composite control signal.

52. The method of claim 46 wherein the actuator means is electromagnetic and has a load-acceleration/deceleration response related to the magnitude of an electric current supplied thereto and said method further comprises the steps of:
generating a feedforward scaling function in response to said velocity profile function;
generating a feedforward control signal having a magnitude related to the magnitude of said feedforward scaling function; and
said actuating step further comprises the steps of:
controlling gain of said position error signal;
combining said gain controlled position error signal and said feedforward control signal to generate a composite control signal; and
actuating said motor in response to said composite control signal.

53. In a servo system for controlling a movement of a movable member between an initial position and a final position, the servo system generating a signal for feedback control during the movement having a signal variable indicative of an error in the movement occurring during the movement, a motor adaptive circuit comprising:
means for measuring a variable of the movement occurring during the movement;
means for generating a predetermined value of said variable for a comparable movement by a model servo system and for comparing the measured variable with said predetermined variable; and
means for varying said signal variable in response to said means for comparing.

54. The apparatus of claim 53 wherein said variable of the movement is position of the movable member, said value of the signal is frequency and said variable of the movement is measured only an acceleration of the movable member.

55. The apparatus of claim 54 wherein the model servo system is modeled for the fastest possible movement between said initial position and final position, said means for comparing generates a ratio of a measured change of position to a predetermined change of position and said means for varying comprises rate multiplier means for reducing the frequency of said signal in proportion to said ratio.

56. The apparatus of claim 55 wherein said means for measuring and means for generating together comprise;
a latch storing an initial position of the member; and
memory means responsive to said latch and to a signal indicating current position of the member during movement for generating ration having a value proportional to the difference between current position and initial position.

57. The apparatus of claim 56 further comprising:
means for timing an acceleration period of the movable member;
latch means for storing said ratio when the acceleration period extends for a predetermined period of time; and
said rate multiplier means is responsive to the stored ratio.

58. A method of adapting a servo control system using frequency varying signal to indicate error in a movement of a movable member comprising the steps of:
measuring actual movement of the member for a predetermined period of time;
comparing the measured movement with a predetermined movement value representing the greatest possible movement achievable during the predetermined period by a model servo system; and
varying the frequency of the error signal in response to said comparing step.

* * * * *